United States Patent
Poirier et al.

(10) Patent No.: US 11,197,006 B2
(45) Date of Patent: Dec. 7, 2021

(54) WAVEFRONT PARALLEL PROCESSING OF LUMA AND CHROMA COMPONENTS

(71) Applicant: InterDigital VC Holdings, Inc., Wilmington, DE (US)

(72) Inventors: Tangi Poirier, Cesson-Sevigne (FR); Fabrice Le Leannec, Cesson-Sevigne (FR); Franck Galpin, Cesson-Sevigne (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 17/047,908

(22) PCT Filed: Jun. 21, 2019

(86) PCT No.: PCT/US2019/038477
§ 371 (c)(1),
(2) Date: Oct. 15, 2020

(87) PCT Pub. No.: WO2020/005758
PCT Pub. Date: Jan. 2, 2020

(65) Prior Publication Data
US 2021/0144391 A1    May 13, 2021

(51) Int. Cl.
*H04N 19/186* (2014.01)
*H04N 19/176* (2014.01)
(Continued)

(52) U.S. Cl.
CPC ......... *H04N 19/186* (2014.11); *H04N 19/176* (2014.11); *H04N 19/70* (2014.11); *H04N 19/96* (2014.11)

(58) Field of Classification Search
None
See application file for complete search history.

(56) References Cited

U.S. PATENT DOCUMENTS

| 7,830,959 B2 | 11/2010 | Park et al. |
| 2008/0123750 A1 | 5/2008 | Bronstein et al. |

(Continued)

FOREIGN PATENT DOCUMENTS

EP    2230849 A1    9/2010

OTHER PUBLICATIONS

Kefalas et al., "A Parallel Luma-Chroma Filtering Architecture for H.264/AVC Deblocking Filter", 2015 IEEE 5th International Conference on Consumer Electronics Berlin (ICCE-Berlin), pp. 273-276, IEEE, 2015.

(Continued)

*Primary Examiner* — Christopher Braniff
(74) *Attorney, Agent, or Firm* — Xiaoan Lu

(57) ABSTRACT

At least a method and an apparatus are presented for improving parallelization for wavefront parallel encoding and decoding of luma and chroma components of a vide picture. For example, a luma component and a chroma component of a video picture are independently subdivided into respectively a plurality of luma coding units and a plurality of chroma coding units. A context-based adaptive binary coding context variable is propagated from a previous row to a current row of the independently subdivided plurality of luma coding units, and a context-based adaptive binary coding context variable is propagated from a previous row to a current row of the independently subdivided plurality of chroma coding units. The video picture is encoded or decoded using the propagations to provide the wavefront parallel processing.

20 Claims, 11 Drawing Sheets

(51) Int. Cl.
*H04N 19/70* (2014.01)
*H04N 19/96* (2014.01)
*H04N 19/167* (2014.01)
*H04N 19/436* (2014.01)
*H04N 19/13* (2014.01)

(56) References Cited

U.S. PATENT DOCUMENTS

2014/0003531 A1\* 1/2014 Coban .................. H04N 19/436
 375/240.24
2016/0381365 A1 12/2016 Pearson
2017/0272748 A1\* 9/2017 Seregin .................. H04N 19/11

OTHER PUBLICATIONS

Kim et al., "Luma-chroma separated processing for fast flow-based image abstraction on mobile devices", pp. 1838-1839, Electronics Letters vol. 50 No. 24, Nov. 20, 2014.
Henry, "Wavefront Parallel Processing", Document: JCTVC-E196, Joint Collaborative Team on Video Coding (JCT-VC) of ITU-T SG16 WP3 and ISO/IEC JTC1/SC29/WG11, 5th Meeting: Geneva, CH, pp. 1-9, 16-23, 2011.

\* cited by examiner

1300

1310 accessing independently subdivided luma component and independently subdivided chroma component of a video picture, wherein the luma component is independently subdivided into a plurality of luma coding units and the chroma component is independently subdivided into a plurality of chroma coding units, and wherein a context-based adaptive binary coding context variable from a previous row is propagated to a current row of the independently subdivided plurality of luma coding units and a context-based adaptive binary coding context variable from a previous row is propagated to a current row of the independently subdivided plurality of chroma coding units

1320 decoding the video picture using the propagated context-based adaptive binary coding context variable of the independently subdivided plurality of luma coding units and the propagated context-based adaptive binary coding context variable of the independently subdivided plurality of chroma coding units to provide the wavefront parallel processing

FIG. 13

WAVEFRONT PARALLEL PROCESSING OF LUMA AND CHROMA COMPONENTS

This application claims the benefit, under 35 U.S.C. § 371 of International Application No. PCT/US2019/038477, filed Jun. 21, 2019, which was published on Jan. 2, 2020, which claims the benefit of European Patent Application Nos. EP18305833.8 filed Jun. 29, 2018 and EP18306208.2 filed Sep. 17, 2018.

TECHNICAL FIELD

The present embodiments generally relate to a method and an apparatus for video encoding or decoding, and more particularly, a method and an apparatus for improving level of parallelization for wavefront parallel encoding and decoding of luma and chroma components compared to existing video compression systems.

BACKGROUND

To achieve high compression efficiency, image and video coding schemes usually employ prediction and transform to leverage spatial and temporal redundancy in the video content. Generally, intra or inter prediction is used to exploit the intra or inter frame correlation, then the differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction.

Wavefront parallel processing (WPP) is a technique that has been used to enable efficient parallel processing of video data. For example, in the ITU-T H.265 HEVC standard, a compliant decoder is able to decode wavefront parallel processing enabled and encoded picture data in which each coding tree unit (CTU) row of the encoded picture constitutes a separate partition or thread, and the context-adaptive binary arithmetic coding (CABAC) context variables from the second CTU of the previous row are propagated to the first CTU of the current row. Therefore, each video row of a picture may be decoded in parallel with little wait time.

SUMMARY

According to an embodiment, a method for video encoding using wavefront parallel processing is presented, comprising: independently subdividing a luma component and a chroma component of a video picture into respectively a plurality of luma coding units and a plurality of chroma coding units; propagating a context-based adaptive binary coding context variable from a previous row to a current row of the independently subdivided plurality of luma coding units; propagating a context-based adaptive binary coding context variable from a previous row to a current row of the independently subdivided plurality of chroma coding units; and encoding the video picture using the propagating of the context-based adaptive binary coding context variable of the independently subdivided plurality of luma coding units and the propagating of the context-based adaptive binary coding context variable of the independently subdivided plurality of chroma coding units to provide the wavefront parallel processing.

According to another embodiment, a method for video decoding using wavefront parallel processing is presented, comprising: accessing independently subdivided luma component and independently subdivided chroma component of a video picture, wherein the luma component is independently subdivided into a plurality of luma coding units and the chroma component is independently subdivided into a plurality of chroma coding units, and wherein a context-based adaptive binary coding context variable from a previous row is propagated to a current row of the independently subdivided plurality of luma coding units and a context-based adaptive binary coding context variable from a previous row is propagated to a current row of the independently subdivided plurality of chroma coding units; and decoding the video picture using the propagated context-based adaptive binary coding context variable of the independently subdivided plurality of luma coding units and the propagated context-based adaptive binary coding context variable of the independently subdivided plurality of chroma coding units to provide the wavefront parallel processing.

According to another embodiment, an apparatus for video encoding is presented, comprising one or more processors, wherein said one or more processors are configured to: independently subdivide a luma component and a chroma component of a video picture into respectively a plurality of luma coding units and a plurality of chroma coding units; propagate a context-based adaptive binary coding context variable from a previous row to a current row of the independently subdivided plurality of luma coding units; propagate a context-based adaptive binary coding context variable from a previous row to a current row of the independently subdivided plurality of chroma coding units; and encode the video picture using the propagating of the context-based adaptive binary coding context variable of the independently subdivided plurality of luma coding units and the propagating of the context-based adaptive binary coding context variable of the independently subdivided plurality of chroma coding units to provide the wavefront parallel processing.

According to another embodiment, an apparatus for video decoding is presented, comprising one or more processors, wherein said one or more processors are configured to: access independently subdivided luma component and independently subdivided chroma component of a video picture, wherein the luma component is independently subdivided into a plurality of luma coding units and the chroma component is independently subdivided into a plurality of chroma coding units, and wherein a context-based adaptive binary coding context variable from a previous row is propagated to a current row of the independently subdivided plurality of luma coding units and a context-based adaptive binary coding context variable from a previous row is propagated to a current row of the independently subdivided plurality of chroma coding units; and decode the video picture using the propagated context-based adaptive binary coding context variable of the independently subdivided plurality of luma coding units and the propagated context-based adaptive binary coding context variable of the independently subdivided plurality of chroma coding units to provide the wavefront parallel processing.

According to another embodiment, an apparatus for video encoding is presented, comprising: means for independently subdividing a luma component and a chroma component of a video picture into respectively a plurality of luma coding units and a plurality of chroma coding units; means for propagating a context-based adaptive binary coding context variable from a previous row to a current row of the independently subdivided plurality of luma coding units; propagating a context-based adaptive binary coding context variable from a previous row to a current row of the independently subdivided plurality of chroma coding units; and means for encoding the video picture using the propagating of the context-based adaptive binary coding context variable of the independently subdivided plurality of luma coding units and the propagating of the context-based adaptive binary coding context variable of the independently subdivided plurality of chroma coding units to provide the wavefront parallel processing According to another embodiment, an apparatus for video decoding is presented, comprising: means for accessing independently subdivided luma component and independently subdivided chroma component of a video picture, wherein the luma component is independently subdivided into a plurality of luma coding units and the chroma component is independently subdivided into a plurality of chroma coding units, and wherein a context-based adaptive binary coding context variable from a previous row is propagated to a current row of the independently subdivided plurality of luma coding units and a context-based adaptive binary coding context variable from a previous row is propagated to a current row of the independently subdivided plurality of chroma coding units; and means for decoding the video picture using the propagated context-based adaptive binary coding context variable of the independently subdivided plurality of luma coding units and the propagated context-based adaptive binary coding context variable of the independently subdivided plurality of chroma coding units to provide the wavefront parallel processing According to another embodiment, a video signal comprising a video picture is presented, formed by performing: independently subdividing a luma component and a chroma component of the video picture into respectively a plurality of luma coding units and a plurality of chroma coding units; propagating a context-based adaptive binary coding context variable from a previous row to a current row of the independently subdivided plurality of luma coding units; propagating a context-based adaptive binary coding context variable from a previous row to a current row of the independently subdivided plurality of chroma coding units; and encoding the video picture using the propagating of the context-based adaptive binary coding context variable of the independently subdivided plurality of luma coding units and the propagating of the context-based adaptive binary coding context variable of the independently subdivided plurality of chroma coding units to provide the wavefront parallel processing.

BRIEF DESCRIPTION OF THE DRAWINGS

FIG. 13 illustrates an exemplary method of video decoding, according to an embodiment.

DETAILED DESCRIPTION

The present disclosure aims at improving the level of parallelization compared to existing video compression systems, for example, the H.265/HEVC system as described in ITU-T H.265 TELECOMMUNICATION STANDARDIZATION SECTOR OF ITU (10/2014), SERIES H: AUDIOVISUAL AND MULTIMEDIA SYSTEMS, Infrastructure of audiovisual services—Coding of moving video, High efficiency video coding, Recommendation ITU-T H.265, and in "Algorithm description for Versatile Video Coding and Test Model 1 (VTM 1)", J. Chen, E. Alshina, document JVET-J1002, Joint Video Experts Team (JVET) of ITU-T SG 16 WP 3 and ISO/IEC JTC 1/SC 29/WG 11, 10th Meeting, San Diego, US, 10-20 Apr. 2018.

The present disclosure proposes a method and an apparatus to allow the parsing of luma and chroma related syntax in parallel, as in Wavefront Parallel Processing (WPP), as described in "Wavefront Parallel Processing", Document JCTVC-E196, Joint Collaborative Team on Video Coding of ISO/IEC JTC1/SC29/WG11, 5th Meeting: Geneva, CH, 16-23 Mar. 2011.

Figure 1:
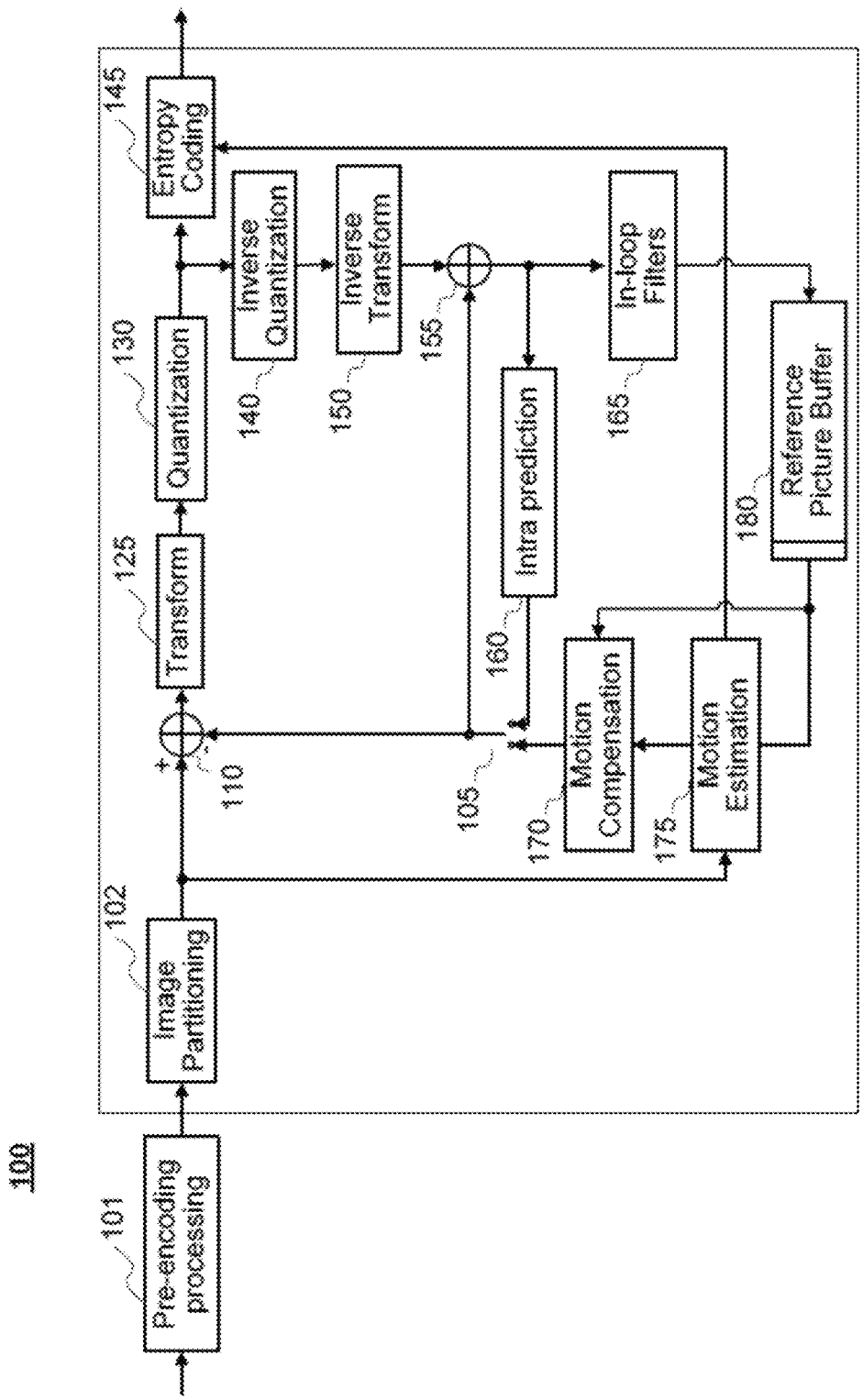
FIG. 1 illustrates a block diagram of an embodiment of a video encoder.

FIG. 1 illustrates an exemplary video encoder 100, such as a High Efficiency Video Coding (HEVC) encoder. FIG. 1 may also illustrate an encoder in which improvements are made to the HEVC standard or an encoder employing technologies similar to HEVC, such as a JEM (Joint Exploration Model) encoder under development by JVET (Joint Video Exploration Team).

In the present application, the terms "reconstructed" and "decoded" may be used interchangeably, the terms "encoded" or "coded" may be used interchangeably, and the terms "image," "picture" and "frame" may be used interchangeably. Usually, but not necessarily, the term "reconstructed" is used at the encoder side while "decoded" is used at the decoder side.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In HEVC, to encode a video sequence with one or more pictures, a picture is partitioned (102) into one or more slices where each slice can include one or more slice segments. A slice segment is organized into coding units, prediction units, and transform units. The HEVC specification distinguishes between "blocks" and "units," where a "block" addresses a specific area in a sample array (e.g., luma, Y), and the "unit" includes the collocated blocks of all encoded color components (Y, Cb, Cr, or monochrome), syntax elements, and prediction data that are associated with the blocks (e.g., motion vectors).

For coding, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block, and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB, and TB of the luma component applies to the corresponding CU, PU, and TU. In the present application, the term "block" can be used to refer, for example, to any of CTU, CU, PU, TU, CB, PB, and TB. In addition, the "block" can also be used to refer to a macroblock and a partition as specified in H.264/AVC or other video coding standards, and more generally to refer to an array of data of various sizes.

In the exemplary encoder 100, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU, and indicates the intra/inter decision by a prediction mode flag. Prediction residuals are calculated by subtracting (110) the predicted block from the original image block.

In order to exploit the spatial redundancy, CUs in intra mode are predicted from reconstructed neighboring samples (i.e., reference samples) within the same slice. The causal neighboring CUs have already been encoded/decoded when the encoding/decoding of the current CU is considered. To avoid mismatch, the encoder and the decoder have the same prediction. Therefore, both the encoder and the decoder use the information from the reconstructed/decoded neighboring causal CUs to form prediction for the current CU.

The prediction residuals are then transformed (125) and quantized (130). The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture, for example, to perform deblocking/SAO (Sample Adaptive Offset) filtering to reduce encoding artifacts. The filtered image is stored at a reference picture buffer (180).

Figure 2:
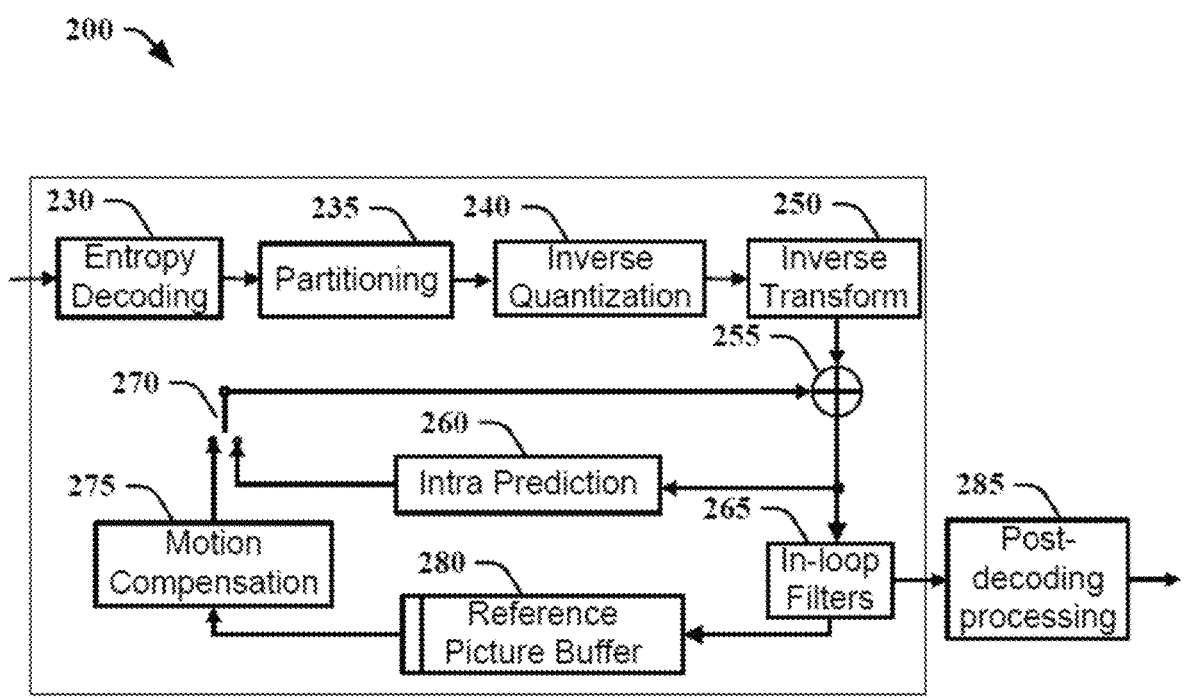
FIG. 2 illustrates a block diagram of an embodiment of a video decoder.

FIG. 2 illustrates a block diagram of an exemplary video decoder 200, such as an HEVC decoder. In the exemplary decoder 200, a bitstream is decoded by the decoder elements as described below. Video decoder 200 generally performs a decoding pass reciprocal to the encoding pass as described in FIG. 1, which performs video decoding as part of encoding video data. FIG. 2 may also illustrate a decoder in which improvements are made to the HEVC standard or a decoder employing technologies similar to HEVC, such as a JEM decoder.

In particular, the input of the decoder includes a video bitstream, which may be generated by video encoder 100. The bitstream is first entropy decoded (230) to obtain transform coefficients, motion vectors, picture partitioning information, and other coded information. The picture partitioning information indicates the size of the CTUs, and a manner a CTU is split into CUs, and possibly into PUs when applicable. The decoder may therefore divide (235) the picture into CTUs, and each CTU into CUs, according to the decoded picture partitioning information. The transform coefficients are de-quantized (240) and inverse transformed (250) to decode the prediction residuals.

Combining (255) the decoded prediction residuals and the predicted block, an image block is reconstructed. The predicted block may be obtained (270) from intra prediction (260) or motion-compensated prediction (i.e., inter prediction) (275). As described above, AMVP and merge mode techniques may be used to derive motion vectors for motion compensation, which may use interpolation filters to calculate interpolated values for sub-integer samples of a reference block. In-loop filters (265) are applied to the reconstructed image. The filtered image is stored at a reference picture buffer (280).

The decoded picture can further go through post-decoding processing (285), for example, an inverse color transform (e.g., conversion from YCbCr 4:2:0 to RGB 4:4:4) or an inverse remapping performing the inverse of the remapping process performed in the pre-encoding processing (101). The post-decoding processing may use metadata derived in the pre-encoding processing and signaled in the bitstream.

As described above, in HEVC, encoding of a frame of a video sequence is based on a block structure. A frame is divided into square coding tree units (CTUs), which may undergo quadtree (QT) splitting to multiple coding units based on rate-distortion criteria. Each CU is either intra-predicted, that is spatially predicted from the causal neighbor CUs, or inter-predicted, that is, temporally predicted from reference frames already decoded. In I-slices all CUs are intra-predicted, whereas in P and B slices the CUs can be either intra or inter-predicted. For intra prediction, HEVC defines 35 prediction modes which include one planar mode (indexed as mode 0), one DC mode (indexed as mode 1) and 33 directional prediction modes (indexed as modes 2-34).

In JEM, the QTBT (Quadtree plus Binary Tree) structure removes the concept of multiple partition types in HEVC, i.e., removes the separation of CU, PU and TU concepts. A Coding Tree Unit (CTU) is firstly partitioned by a quadtree structure. The quadtree leaf nodes are further partitioned by a binary tree structure. The binary tree leaf node is named as Coding Units (CUs), which is used for prediction and transform without further partitioning. Thus, the CU, PU and TU have the same block size in the new coding QTBT block structure. In JEM, a CU consists of Coding Blocks (CBs) of different color components. It is the level at which the prediction process and residual transform are performed in JEM. A CU can be square or rectangle shape.

In many decoder implementations, the process is split in two stages: the parsing, and the decoding. Generally, the parsing process refers to the process of extracting the syntax elements from the bitstream, where a syntax is an element of data represented in a bitstream and the semantics specify the meaning of the values of a syntax element. The semantics may further constrain the values a syntax element may choose from, and define variables, based on syntax elements, to be used in the decoding process.

The parsing may just be limited to the decoding of syntax elements values, where bits from the bitstream are used as inputs, and syntax element values are provided as outputs. For each element, a descriptor can be used in the syntax table to specify the applicable parsing process.

The decoding process specifies how the syntax elements are used to reconstruct the samples. The decoding process takes the syntax element values as input, and reconstructs the video sequence based on the semantics of the syntax elements.

It should be noted that the "decoding process" may also be referred to as a "reconstruction process," and the phrase "decoding process" may generally be applied to the combination of the "parsing process" and the "decoding process." Whether the phrase "decoding process" as used is intended to refer specifically to a subset of operations (e.g., without the parsing), or generally to the decoding process (e.g., with the parsing) will be clear based on the context of the specific descriptions and is believed to be well understood by those skilled in the art.

In the HEVC video compression standard, a picture is divided into so-called Coding Tree Units (CTU), whose size are typically 64×64, 128×128, or 256×256 pixels. CTUs are processed in raster scan order, with the CABAC entropy coder updating its probabilities on the fly. In order to encode the current CTU, the left, top-left, top, and top-right CTUs need to be available (already decoded) in order to use spatial and motion information for the Intra and Inter prediction. When starting the entropy coding of the symbols, the CABAC probabilities used are simply the ones that are available after the previous CTU (left CTU) has been processed. In particular, due to the raster scan order, the first CTU of a line uses the CABAC probabilities available after the processing of the last CTU from the previous line. In HEVC, no CABAC context used for luma-related syntax elements is used for chroma-related syntax elements.

In HEVC, the base entities are the Coding Tree Block (CTB) and the corresponding Coding Tree Unit (CTU). The CTU contains the CTBs of the encoded color components and forms a complete entity in the bitstream syntax. The syntax for the coding tree (partitioning of a coding tree block) is common to all components. For a given Coding Unit, the syntax related to each Coded Blocks (CBs) are interlaced, for example for an Intra coded CU, intra luma mode is coded first then intra chroma mode, then cbfs (coded_block_flag) for the two chroma components are coded, then the cbf for the luma component is coded. Then residual for luma is coded before residual for chroma components.

In WPP mode, each CTU row is processed relative to its preceding CTU row by using a delay of two consecutive CTUs. In this way no dependencies between consecutive CTU rows are broken at the partition boundaries except for CABAC contexts variables at the end of each CTU row. To mitigate the potential loss in coding efficiency that would result from the conventional CABAC initialization at the starting point of each CTU row, the content of the (partially) adapted CABAC context variables are propagated from the encoded/decoded second CTU of the preceding CTU row to the first CTU of the current CTU row. As a result, the coding efficiency losses introduced by WPP are relatively small compared to the case of a picture encoding using no WPP but with otherwise identical settings. Also, WPP does not change the regular raster scan order of CTUs. Furthermore, by using a relatively simple CABAC transcoding technique, a WPP bitstream can be transcoded to or from a non-WPP bitstream without any change to the picture reconstruction process.

Figure 3A:
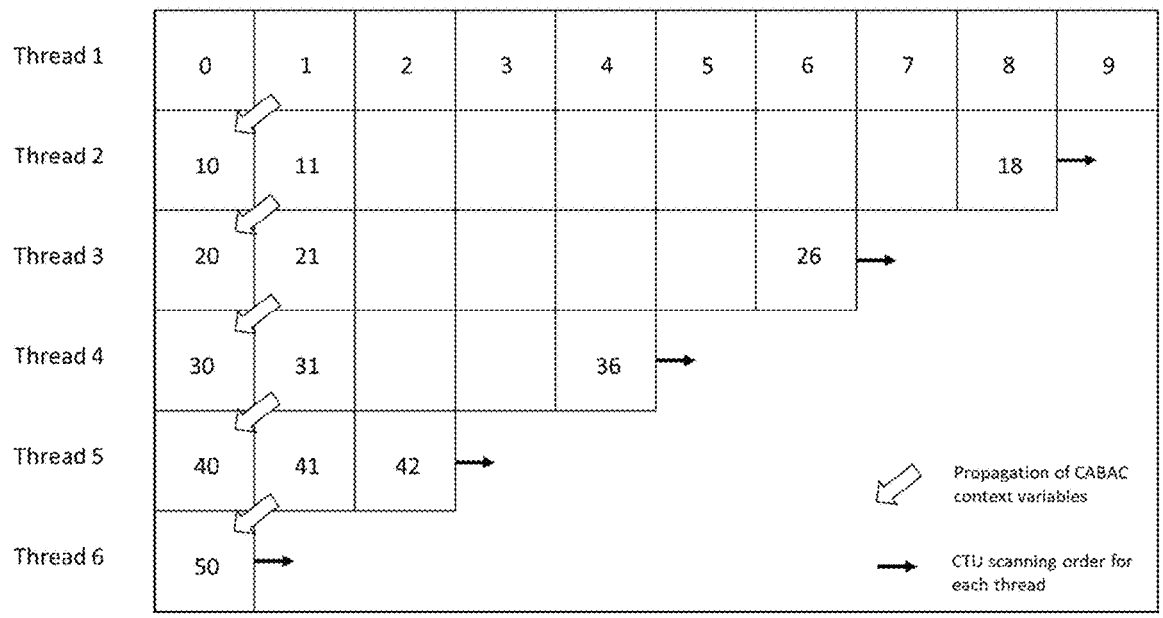
FIG. 3A is a pictorial example depicting propagation of CABAC context variables using wavefront parallel processing (WPP) in HEVC.

When WPP is enabled, a number of threads up to the number of CTU rows in a picture can work in parallel to process the individual CTU rows, where the number of CTU rows depends on the ratio of the picture height in luma samples and the luma CTB size in either width or height, as show FIG. 3A. FIG. 3A illustrates, e.g., wavefront parallel processing with CABAC context being propagated as used in HEVC.

Figure 3B:
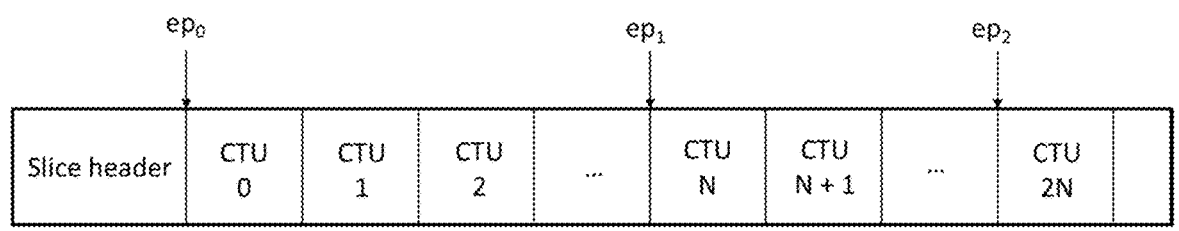
FIG. 3B illustrates the organization of the bitstream in case of WPP in HEVC.

When WPP is enabled, the slice segment header contains a list of byte-aligned entry points to the bitstream that mark the beginning of the first CTU in each row. The decoding process of each row starts from the respective entry point in the bitstream. FIG. 3B illustrates the organization of the bitstream in case of WPP where the arrows indicate the entry points for starting decoding at byte position indicated in the slice header. In HEVC, the syntax data for luma and chroma for a given CTU are interlaced for each CU in the bitstream.

In JEM, as described in "Algorithm Description of Joint Exploration Test Model 7 to (JEM7)", Document JVET-G1001, Joint Video Exploration Team of ISO/IEC JTC1/SC29/WG11, 7th Meeting: Torino, IT, 13-21 Jul. 2017, separation of luma and chroma coding tree on the same CTU has been introduced, in a mode called DualTree. In Intra slices, luma and chroma can have different QTBT structures. The luma CTB is partitioned into CUs by a QTBT structure, and the chroma CTBs are partitioned into chroma CUs by another QTBT structure. For P and B slices, the luma and chroma have the same QTBT structure in one CTU. This means that a CU in an I slice consists of a coding block of the luma component or coding blocks of two chroma components, and a CU in a P or B slice consists of coding blocks of all luma and chroma components.

To reduce the cross-component redundancy, a cross-component linear model (CCLM) prediction mode is used in the JEM, for which the chroma samples are predicted based on the reconstructed luma samples of the same CU by using a linear model as follows:

$$\text{pred}_c(i,j) = \alpha \cdot \text{rec}_L'(i,j) + \beta \qquad \text{Equation 1}$$

where $\text{rec}_L'$ is the reconstructed luma sample, $\text{pred}_c$ is the predicted chroma sample, i,j are respectively the row and the column of the current sample. The scaling factor $\alpha$ and the offset $\beta$ are derived by minimizing the regression error between the neighbouring reconstructed luma and chroma samples around the current block.

A problem solved by this disclosure is to allow better parallelization at the encoder and the decoder with a minor loss in coding performance, by taking into account that in Intra slices using DualTree mode, coding trees are separated for luma and chroma. Intra slices are often the most slowly encoded/decoded, as the syntax and residual to code/decode are more important compared to P/B slices. It is noted that propagation of CABAC contexts in the encoder should be performed in the same manner as the decoder in order for the decoder to be parallel. Also, while the encoder can be implemented in parallel, the encoder does not have to use parallel implementations to support parallel implementations at the decoder.

Figure 4A:
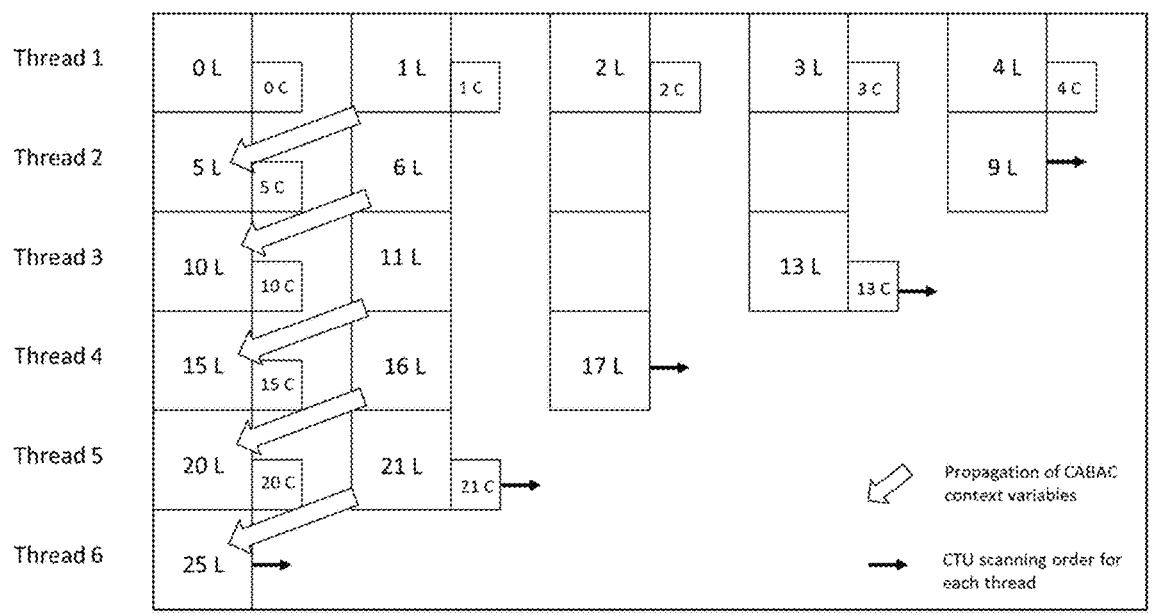
FIG. 4A is a pictorial example depicting an implementation of WPP for separated luma/chroma trees.

In a straightforward combination of WPP and separate coding trees for luma and chroma, when a CTU is processed, luma Coding Tree Block (CTB) is processed first then chroma CTB is processed. In the bitstream, syntax follow the same order: CTB luma from CTU_0 then CTB chroma from CTU_0, CTB luma from CTU_1, then CTB chroma from CTU_1 . . . , and etc. This is illustrated in FIG. 4A which shows a straightforward implementation of WPP for separated luma/chroma trees.

Luma and chroma CTB may share some CABAC contexts, for instance in Versatile Test Model 1 (VTM-1.0), split_cu_flag, split_cu_mode_mt_flag, emt_tu_index or some residual syntax contexts (e.g., lastX, lastY, SigCGPattern) are shared between luma and chroma. For example, to share the contexts between luma and chroma, for split_cu_flag, the context model of luma CTB (N-1) will be used for collocated chroma CTB (N-1), then the context model for chroma CTB (N-1) will be used for next luma CTB N, and etc.

In VTM-1.0, in case Dual Tree is enabled for the Intra slice, Quad Tree split is implicit for each Coding Block as long the size of the Coding Block is greater than 64 samples. Furthermore, in the bitstream luma syntax and chroma syntax for each 64×64 Coding blocks are interlaced in the bitstream.

Figure 4B:
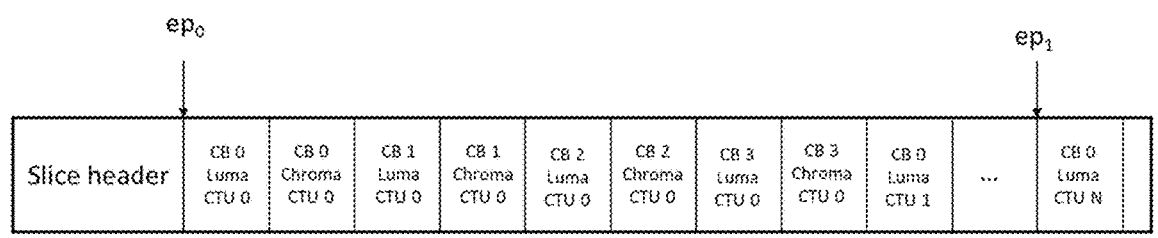
FIG. 4B illustrates the organization of the bitstream in case of WPP in VTM 5.0.

When WPP is enabled, the slice segment header contains a list of byte-aligned entry points to the bitstream that mark the beginning of the first CTU in each row. The decoding process of each row starts from the respective entry point in the bitstream. FIG. 4B illustrates the organization of the bitstream in case of WPP where the arrows indicate the entry points for starting decoding at byte position indicated in the slice header. In VTM-5.0, the syntax data for luma and chroma for a given CTU, in case of Dual Tree, are interlaced for each 64×64 coding blocks in the bitstream.

Figure 5:
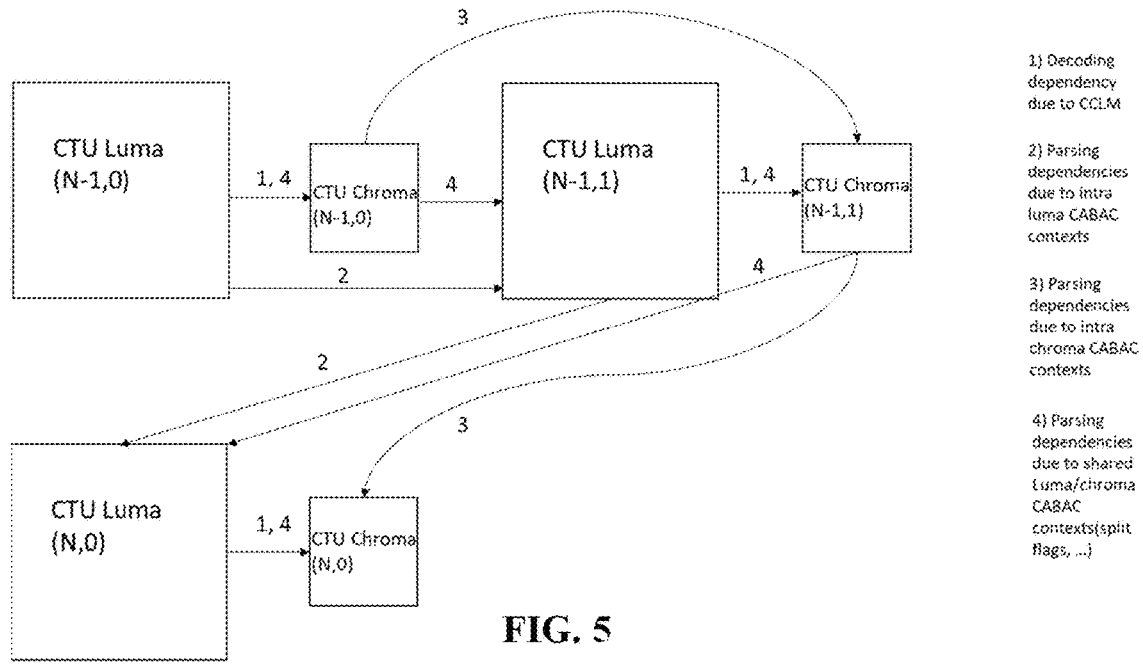
FIG. 5 is a pictorial example depicting dependencies for parsing and decoding for luma and chroma CTUs in VTM-1.0.

In FIG. 5, we show the parsing and decoding dependencies for luma and chroma CTUs in VTM-1.0. In this and the other dependencies figures later, we do not show decoding dependencies with neighbors for directional prediction for simplicity.

In the following, using some syntax elements in HEVC or VVC (Benjamin Bross, "Versatile Video Coding (Draft 1)" JVET-J1001-v2, JVET 10th Meeting: San Diego, US, 10-20 Apr. 2018) as examples, we explain what we consider as categories 2)-4) as shown in FIG. 3A. It should be noted that these syntax elements are described for exemplary purposes, and there can be more syntax elements for each category.

Section 7.3.8.5 of HEVC: Coding Unit Syntax

| | Descriptor |
|---|---|
| coding_unit( x0, y0, log2CbSize ) { | |
| ... | |
|     for( j = 0; j < nCbS; j = j + pbOffset ) | |
|       for( i = 0; i < nCbS; i = i + pbOffset ) | |
|         prev_intra_luma_pred_flag[ x0 + i ][ y0 + j] | ae(v) |
|     for( j = 0; j < nCbS; j = j + pbOffset ) | |
|       for( i = 0; i < nCbs; i = i + pbOffset ) | |
|         if( prev_intra_luma_pred_flag[ x0 + i ][ y0 + j ] ) | |
|           mpm_idx[ x0 + i ][ y0 + j ] | ae(v) |
|         else | |
|           rem_intra_luma_pred_mode[ x0 + i ][ y0 + j ] | ae(v) |
|     if( ChromaArrayType = = 3 ) | |
|       for( j = 0; j < nCbS; j = j + pbOffset ) | |
|         for( i = 0; i < nCbS; i = i + pbOffset ) | |
|           intra_chroma_pred_mode[ x0 + i ][y0 + j ] | ae(v) |
|     else if( ChromaArrayType != 0 ) | |
|       intra_chroma_pred_mode[ x0 ][ y0 ] | ae(v) |
| } | |

Section 7.3.8.11 of HEVC: Residual Coding Syntax

| | Descriptor |
|---|---|
| residual_coding( x0, y0, log2TrafoSize, cIdx ) { | |
|   if( transform_skip_enabled_flag && !cu_transquant_bypass_flag && | |
|     ( log2TrafoSize <= Log2MaxTransformSkipSize ) ) | |
|     transform_skip_flag[ x0 ][ y0 ][ cIdx ] | ae(v) |
|   if( CuPredMode[ x0 ][ y0 ] = = MODE_INTER && explicit_rdpcm_enabled_flag && | |
|     ( transform_skip_flag[ x0 ][ y0 ][ cIdx ] | | cu_transquant_bypass_flag ) ) { | |
|     explicit_rdpcm_flag[ x0 ][ y0 ][ cIdx ] | ae(v) |
|     if( explicit_rdpcm_flag[ x0 ][ y0 ][ cIdx ] ) | |
|       explicit_rdpcm_dir_flag[ x0 ][ y0 ][ cIdx ] | ae(v) |
|   } | |
| ... | |

Section 7.3.4.3 of VVC (Draft 1). Coding Quadtree Syntax

| | Descriptor |
|---|---|
| coding_quadtree( x0, y0, log2CbSize, cqtDepth ) { <br>     if( x0 + ( 1 << log2CbSize) <= pic_width_in_luma_samples && <br>         y0 + ( 1 << log2CbSize ) <= pic_height_in_luma_samples && <br>         log2CbSize > MinQtLog2SizeY ) <br>             qt_split_cu_flag[ x0 ][ y0 ] <br> } <br> if( qt_split_cu flag[ x0 ][ y0 ] ) { <br> ... | <br><br><br><br>ae(v) |

Section 7.3.4.3 of VVC (Draft 1). Multi-Type Tree Syntax

| | Descriptor |
|---|---|
| multi_type_tree( x0, y0, cbWidth, cbHeight, mttDepth, partIdx ) { <br>   if( allowSplitBtVer \|\| allowSplitBtHor \|\| allowSplitTtVer \|\| allowSplitTtHor ) <br>     mtt_split_cu_flag <br>   if( mtt_split_cu_flag ) { <br>     if( ( allowSplitBtHor \|\| allow SplitTtHor ) && <br>       ( allowSplitBtVer \|\| allowSplitTtVer ) ) <br>       mtt_split_cu_vertical_flag <br>     if( ( allowSplitBtVer && allowSplitTtVer && mtt_split_cu_vertical_flag ) \|\| <br>       ( allowSplitBtHor && allowSplitTtHor && !mtt_split_cu_vertical_flag ) ) <br>       mtt_split_cu_binary_flag <br> ... | <br><br>ae(v) <br><br><br><br>ae(v) <br><br><br>ae(v) |

1. Syntax Element Specific to Intra Luma Prediction: (Category 2)

The syntax elements prev_intra_luma_pred_flag[x0+i][y0+j], mpm_idx[x0+i][y0+j] and rem_intra_luma_pred_mode[x0+i][y0+j] specify the intra prediction mode for luma samples. The array indices x0+i, y0+j specify the location (x0+i, y0+j) of the top-left luma sample of the considered prediction block relative to the top-left luma sample of the picture. When prev_intra_luma_pred_flag[x0+i][y0+j] is equal to 1, the intra prediction mode is inferred from a neighbouring intra-predicted prediction unit according to clause 8.4.2.

2. Syntax Element Specific to Intra Chroma Prediction: (Category 3)

intra_chroma_pred_mode[x0][y0] specifies the intra prediction mode for chroma samples. The array indices x0, y0 specify the location (x0, y0) of the top-left luma sample of the considered prediction block relative to the top-left luma sample of the picture.

3. Syntax Element Shared Between Luma and Chroma Prediction, with Separate Context Index In some cases, the same syntax element is shared between luma and chroma, but the context index used is different for luma and chroma (e.g., transform_skip_flag). When the syntax is used for luma, it can be considered as category 2, and when the syntax is used for chroma, it can be considered as category 3.

transform_skip_flag[x0][y0][cIdx] specifies whether a transform is applied to the associated transform block or not: The array indices x0, y0 specify the location (x0, y0) of the top-left luma sample of the considered transform block relative to the top-left luma sample of the picture. The array index cIdx specifies an indicator for the colour component; it is equal to 0 for luma, equal to 1 for Cb and equal to 2 for Cr. transform_skip_flag[x0][y0][cIdx] equal to 1 specifies that no transform is applied to the current transform block. transform_skip_flag[x0][y0][cIdx] equal to 0 specifies that the decision whether transform is applied to the current transform block or not depends on other syntax elements. When transform_skip_flag[x0][y0][cIdx] is not present, it is inferred to be equal to 0.

4. Syntax Element Shared Between Luma and Chroma Prediction, with Shared Context Index: (Category 4)

qt_split_cu_flag[x0][y0] specifies whether a coding unit is split into coding units with half horizontal and vertical size. The array indices x0, y0 specify the location (x0, y0) of the top-left luma sample of the considered coding block relative to the top-left luma sample of the picture.

This syntax corresponds to syntax element split_cu_flag in HEVC.

mtt_split_cu_flag equal to 0 specifies that a coding unit is not split. mtt_split_cu_flag equal to 1 specifies that a coding unit is split into two coding units using a binary split or into three coding units using a ternary split as indicated by the syntax element mtt_split_cu_binary_flag. The binary or ternary split can be either vertical or horizontal as indicated by the syntax element mtt_split_cu_vertical_flag.

When mtt_split_cu_flag is not present, the value of mtt_split_cu_flag is inferred to be equal to 0.

mtt_split_cu_vertical_flag equal to 0 specifies that a coding unit is split horizontally. mtt_split_cu_vertical_flag equal to 1 specifies that a coding unit is split vertically When mtt_split_cu_vertical_flag is not present, it is inferred as follows:

If allowSplitBtHor is equal to TRUE or allowSplitTtHor is equal to TRUE, the value of mtt_split_cu_vertical_flag is inferred to be equal to 0.

Otherwise, the value of mtt_split_cu_vertical_flag is inferred to be equal to 1 mtt_split_cu_binary_flag equal to 0 specifies that a coding unit is split into three coding units using a ternary split. mtt_split_cu_binary_flag equal to 1 specifies that a coding unit is split into two coding units using a binary split.

The parsing process as described in Section 9.3.1 of HEVC will be used as example to illustrate the changes made in various embodiments:

9.3 CABAC Parsing Process for Slice Segment Data
9.3.1 General

This process is invoked when parsing syntax elements with descriptor ae(v) in clauses 7.3.8.1 through 7.3.8.12. Inputs to this process are a request for a value of a syntax element and values of prior parsed syntax elements. Output of this process is the value of the syntax element.

The initialization process of the CABAC parsing process as specified in clause 9.3.2 is invoked when starting the parsing of one or more of the following:
the slice segment data syntax
specified in clause 7.3.8.1
  the coding tree unit syntax specified in clause 7.3.8.2 and the coding tree unit is the first coding tree unit in a tile.
  the coding tree unit syntax specified in clause 7.3.8.2, entropy_coding_sync_enabled_flag is equal to 1 and the associated luma coding tree block is the first luma coding tree block in a coding tree unit row of a tile
    The storage process for context variables is applied as follows:
    When ending the parsing of the coding tree unit syntax in clause 7.3.8.2, entropy_coding_sync_enabled_flag is equal to 1 and either CtbAddrInRs % PicWidthInCtbsY is equal to 1 or both CtbAddrInRs is greater than 1 and TileId[CtbAddrInTs] is not equal to TileId[CtbAddrRsToTs[CtbAddrInRs-2]], the storage process for context variables and Rice parameter initialization states as specified in clause 9.3.2.3 is invoked with TableStateIdxWpp, TableMpsValWpp and TableStatCoeffWpp as outputs.
    When ending the parsing of the general slice segment data syntax in clause 7.3.8.1, dependent_slice_segments_enabled_flag is equal to 1 and end_of_slice_segment_flag is equal to 1, the storage process for context variables and Rice parameter initialization states as specified in clause 9.3.2.3 is invoked with TableStateIdxDs, TableMpsValDs, and TableStatCoeffDs as outputs.

Figure 9:
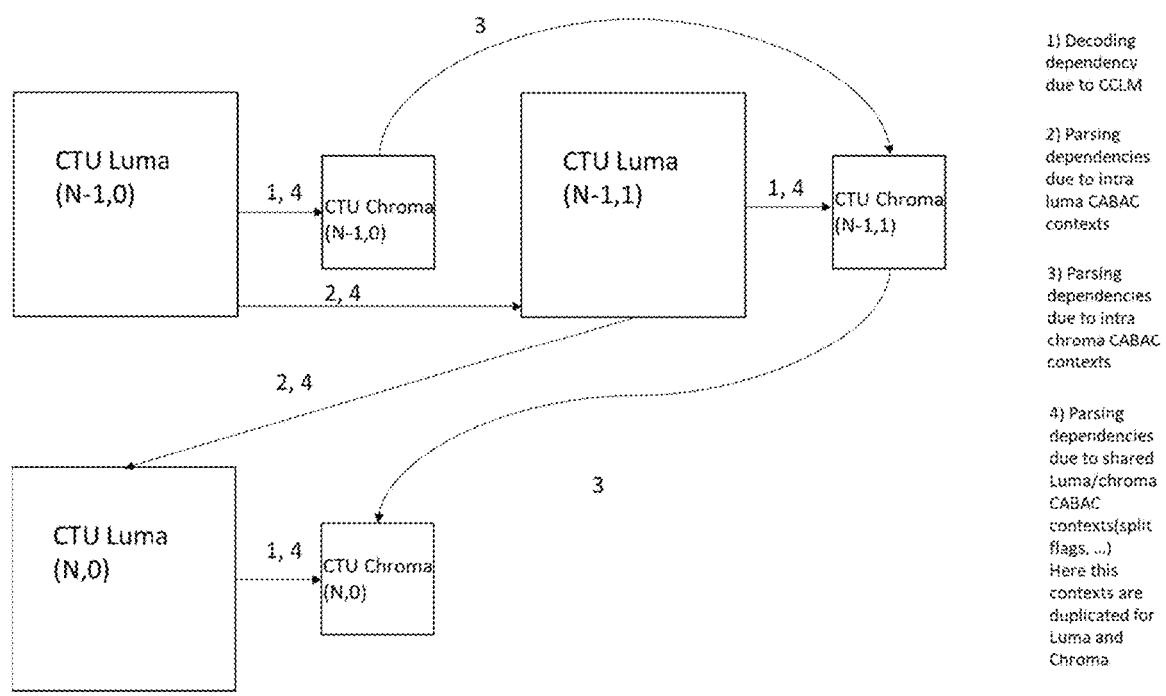
FIG. 9 is a pictorial example depicting dependencies for parsing and decoding for luma and chroma CTUs according to another embodiment.

The whole CABAC parsing process for a syntax element synEl is illustrated in FIG. 9-1.

We propose to separate the processing of luma and chroma coding tree blocks into different threads. In one embodiment, CABAC contexts variables are propagated from second luma CTB of the preceding row to the first luma CTB of the current row. Similarly, CABAC contexts variables are propagated from second chroma CTB of the preceding row to the first chroma CTB of the current row. In addition, the parsing of the chroma CTU does not depend on any luma CTU, thus no more CABAC context is shared between luma and chroma. In the following, we will also describe other variants of CABAC contexts propagation between luma/chroma CTBs, and we can also extend the separation of luma and chroma in different slices and/or Network Abstraction Layer Unit (NALU).

Embodiment 1

Figure 6:
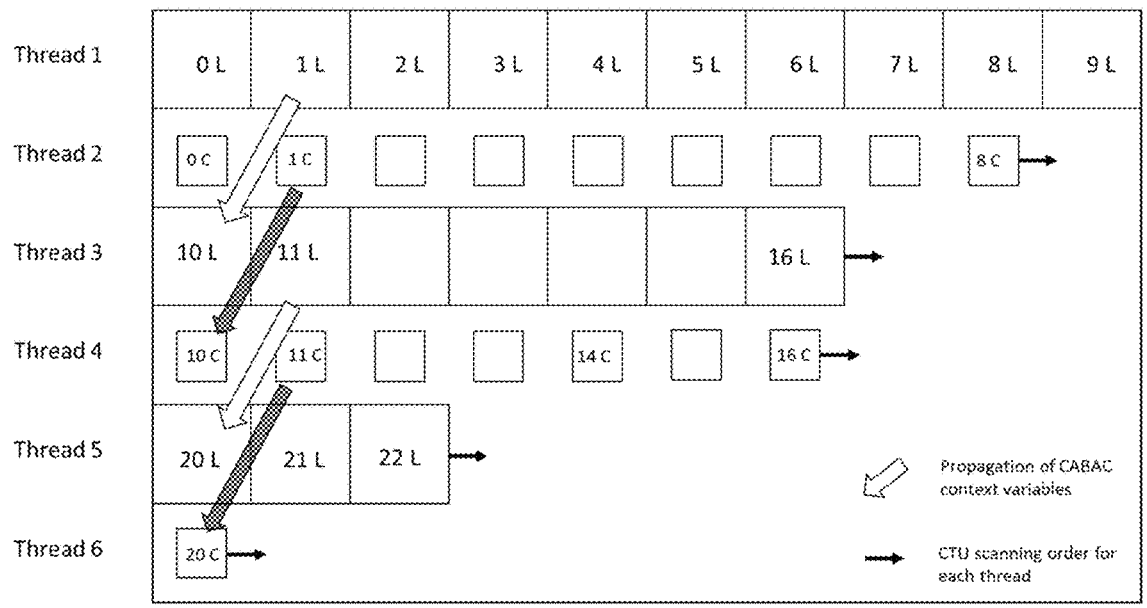
FIG. 6 is a pictorial example depicting an implementation of wavefront processing for coding/decoding of luma/chroma components, according to an embodiment.

FIG. 6 illustrates a method according to an embodiment, where luma CTUs and chroma CTUs may be processed in different threads. Luma CABAC contexts are propagated from the encoded/decoded second CTU luma of the preceding CTU row to the first CTU luma of the current CTU row, then there is no more dependency between luma contexts of previous row and current row. Similarly, chroma CABAC contexts are propagated from the encoded/decoded second CTU chroma of the preceding CTU row to the first CTU chroma of the current CTU row. CABAC contexts shared between luma and chroma are separated, the initialization is the same for the first luma CTU and the first chroma CTU, then the contexts will evolve separately for luma and chroma.

As chroma prediction use reconstructed luma sample, current chroma CTB needs the collocated luma CTB to already have been encoded/decoded. CABAC contexts for the first chroma CTU are initialized without propagation form another CTU. To sum up, for the parsing of CABAC syntax elements, the current chroma CTU does not depend on luma CTUs. For the decoding process, current chroma CTU need collocated luma CTU for prediction.

Usually the propagation of CABAC contexts between chroma CTUs is simpler than between luma CTUs because it typically involves less contexts (e.g., usually only intra chroma contexts related).

Figure 7:
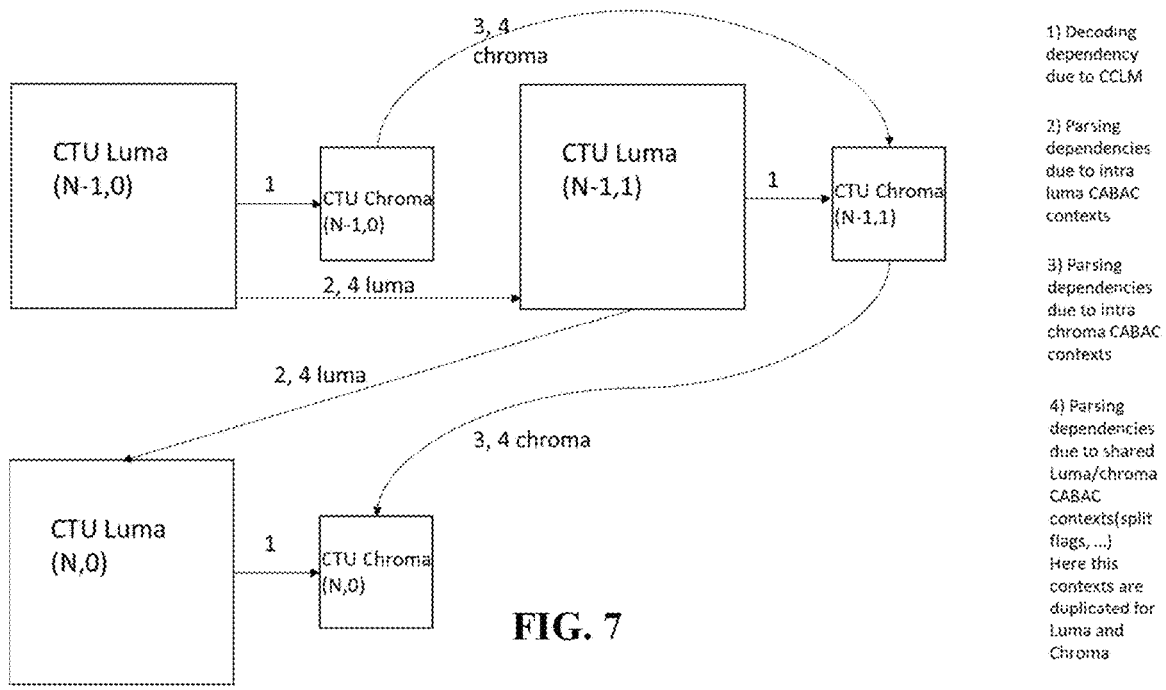
FIG. 7 is a pictorial example depicting dependencies for parsing and decoding for luma and chroma CTUs, according to an embodiment.

In FIG. 7, we show the parsing and decoding dependencies for luma and chroma CTUs, according to an embodiment. As noted before already, in these dependencies figures, we do not show decoding dependencies with neighbors for directional prediction for simplicity.

For the syntax elements whose contexts are shared between luma and chroma, for example, the split flags, the contexts for luma and chroma may be initialized and evolve separately. Alternatively, the contexts for luma and chroma may be duplicated (i.e., the same) at initialization, e.g., at the beginning of the slice, slice segment, or at the beginning of a row, and then evolve separately, as shown in FIG. 7.

Syntax and semantics for category 4 can remain the same. The parsing process can be modified as follows, where the modification is underlined:

9.3 CABAC parsing process for slice segment data
9.3.1 General

This process is invoked when parsing syntax elements with descriptor ae(v) in clauses 7.3.8.1 through 7.3.8.12. Inputs to this process are a request for a value of a syntax element and values of prior parsed syntax elements. Output of this process is the value of the syntax element.

The initialization process of the CABAC parsing process as specified in clause 9.3.2 is invoked when starting the parsing of one or more of the following:
the slice segment data syntax
specified in clause 7.3.8.1
  the coding tree unit syntax specified in clause 7.3.8.2 and the coding tree unit is the first coding tree unit in a tile.
  the coding tree unit syntax specified in clause 7.3.8.2, entropy_coding_sync_enabled_flag is equal to 1 and the associated luma coding tree block is the first luma coding tree block in a coding tree unit row of a tile or the associated chroma coding tree block if the first chroma coding tree block in a coding tree unit row.
    The storage process for context variables is applied as follows:
    When ending the parsing of the coding tree unit syntax in clause 7.3.8.2, entropy_coding_sync_enabled_flag is equal to 1 and either CtbAddrInRs % PicWidthInCtbsY is equal to 1 or both CtbAddrInRs is greater than 1 and TileId[CtbAddrInTs] is not equal to TileId[CtbAddrRsToTs[CtbAddrInRs-2]], the storage process for context variables and Rice parameter initialization states as specified in clause 9.3.2.3 is invoked with TableStateIdxWppLuma, TableStateIdxWppChroma, TableMpsValWppLuma TableMpsValWppChroma, TableStatCoeffWppLuma, TableStatCoeffWppChroma as outputs.

When ending the parsing of the general slice segment data syntax in clause 7.3.8.1, dependent_slice_segments_enabled_flag is equal to 1 and end_of_slice_segment_flag is equal to 1, the storage process for context variables and Rice parameter initialization states as specified in clause 9.3.2.3 is invoked with TableStateIdxDs, TableMpsValDs, and TableStatCoeffDs as outputs.

Embodiment 2, Propagation from Luma CTU to Chroma CTU

Figure 8A:
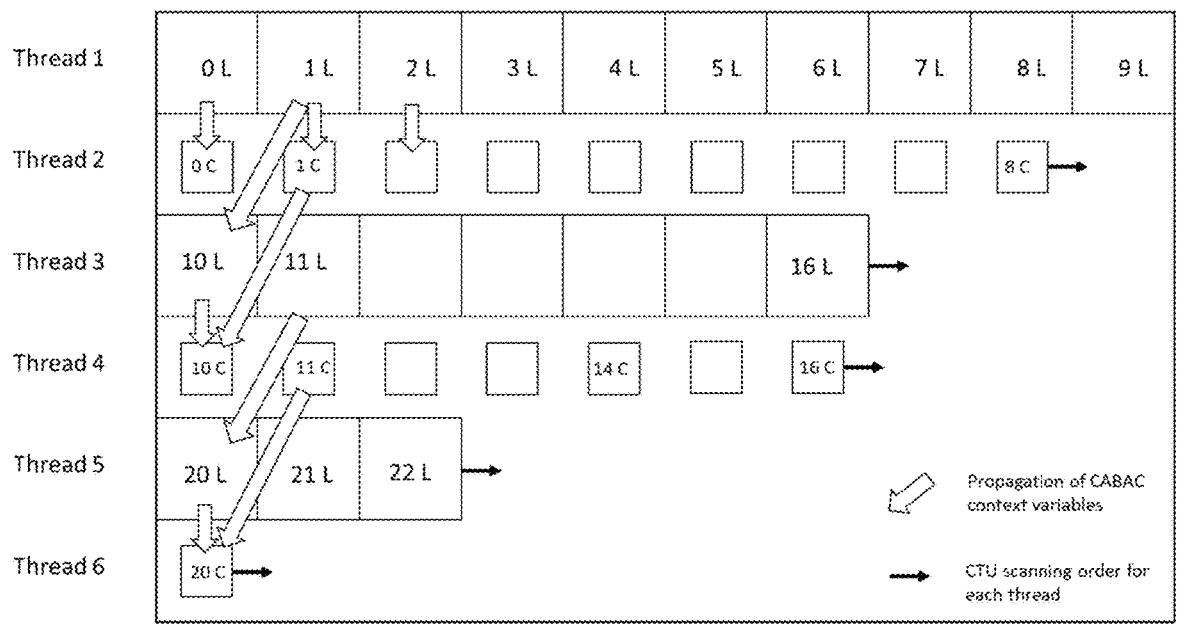
FIG. 8A is a pictorial example depicting propagation of CABAC variable contexts from CTU luma to collocated CTU chroma.

In a second embodiment, CABAC contexts for the chroma CTU are propagated from the collocated luma CTU and from previous chroma CTU. The chroma CTU will benefit from the evolution of the CABAC contexts after the luma CTU, as shown in FIG. 8A. Another change (over embodiment 1) is that, shared contexts between luma and chroma are not propagated from chroma CTU to luma CTU, this ensures that luma CTU can be encoded/decoded separately.

FIG. 9 shows the parsing and decoding dependencies for luma and chroma CTUs, according to an embodiment.

Syntax and semantics for category 4 can remain the same. The parsing process can be modified as follows, where the modification is underlined:

9.3 CABAC parsing process for slice segment data
9.3.1 General
This process is invoked when parsing syntax elements with descriptor ae(v) in clauses 7.3.8.1 through 7.3.8.12. Inputs to this process are a request for a value of a syntax element and values of prior parsed syntax elements. Output of this process is the value of the syntax element.
The initialization process of the CABAC parsing process as specified in clause 9.3.2 is invoked when starting the parsing of one or more of the following:
the slice segment data syntax
specified in clause 7.3.8.1
 the coding tree unit syntax specified in clause 7.3.8.2 and the coding tree unit is the first coding tree unit in a tile.
  the coding tree unit syntax specified in clause 7.3.8.2, entropy_coding_sync_enabled_flag is equal to 1 and the associated luma coding tree block is the first luma coding tree block in a coding tree unit row of a tile or for each chroma coding tree block.
 The storage process for context variables is applied as follows:
 When ending the parsing of the coding tree unit syntax in clause 7.3.8.2, entropy_coding_sync_enabled_flag is equal to 1 and either CtbAddrInRs % PicWidthInCtbsY is equal to 1 or both CtbAddrInRs is greater than 1 and TileId[CtbAddrInTs] is not equal to TileId[CtbAddrRsToTs[CtbAddrInRs-2]], the storage process for context variables and Rice parameter initialization states as specified in clause 9.3.2.3 is invoked with TableStateIdxWppLuma, TableMpsValWppLuma, TableStatCoeffWppLuma as outputs.
 When ending the parsing of the coding tree unit syntax in clause 7.3.8.2, entropy_coding_sync_enabled_flag is equal to 1 the storage process for context variables and Rice parameter initialization states as specified in clause 7.3.8.1, dependent_slice_segments_enabled_flag is equal to 1 and end_of_slice_segment_flag is equal to 1, the storage process for context variables and Rice parameter initialization states as specified in clause 9.3.2.3 is invoked with TableStateIdxDs, TableMpsValDs, and TableStatCoeffDs as outputs.

Embodiment 3, Parallel Wavefront for Luma/Chroma by Design

If we use different and independent CABAC contexts for luma and chroma CTUs, the encoder/decoder may be parallel wavefront processed independently for luma/chroma by design as the propagation of the CABAC contexts are independent between luma and chroma.

This method needs to totally separate the contexts between luma and chroma CTUs, but may lead to losses in performance.

The difference with the first embodiment, is that in this embodiment, contexts are totally separate between luma CTUs and chroma CTUs so that there will be no syntax elements in luma and chroma with shared context. There are no variables shared between luma and chroma, so there is no propagation of context between luma and chroma. Also in this embodiment, even if wavefront parallel processing is not enabled (i.e., all CTUs are processed sequentially), luma CTU and chroma CTU could still be processed in parallel (except that the current chroma CTU depends on the current luma CTU for prediction).

Figure 8B:
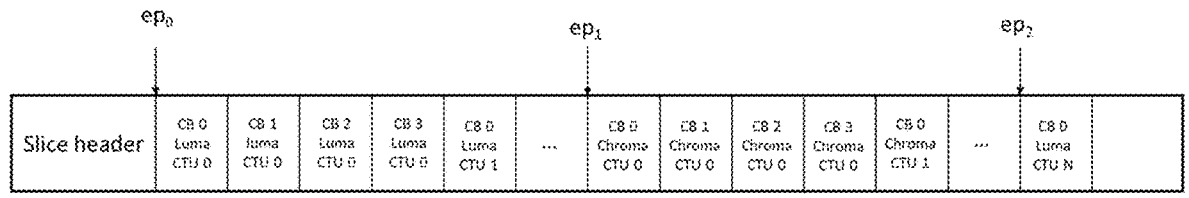
FIG. 8B illustrates the organization of the bitstream in case of WPP according to an embodiment.

When parallel wavefront for luma/chroma is enabled, the slice segment header contains a list of byte-aligned entry points to the bitstream that mark the beginning of the first CTU in each row. The decoding process of each row starts from the respective entry point in the bitstream. FIG. 8B illustrates the organization of the bitstream in case of WPP where the arrows indicate the entry points for starting decoding at byte position indicated in the slice header. In this embodiment, the syntax data for luma and chroma for a given CTU, in case of Dual Tree, are separated in different sub-streams of the bitstream. In combination with WPP, the syntax of luma data from the first row of CTUs are in the first sub-stream that can be accessed with the first entry point. The chroma data from the first row of CTUs are in the second sub-stream that can be accessed with the second entry point. The luma data from the second row of CTUs are in the third sub-stream that can be accessed with the third entry points, and so on so forth.

In the embodiment according to FIG. 8B, there are two sub-streams for each row. In another embodiment, we can use only two sub-streams for the picture, one for luma and one for chroma.

Therefore, for category 4, new syntax elements are introduced to separately represent luma and chroma CTUs, without sharing of the context. Below we show the changes for qt_split_cu_flag, where the changes are underlined, and similar changes can be applied to other syntax elements. For Table 9-8, initValue could take any value and doesn't have to be the same as qt_split_cu_flag_luma as shown in Table 9-7.

qt_split_cu_flag_luma[x0][y0] specifies whether a luma coding unit is split into luma coding units with half horizontal and vertical size. The array indices x0, y0 specify the location (x0, y0) of the top-left luma sample of the considered coding block relative to the top-left luma sample of the picture.

When qt_split_cu_flag_luma[x0][y0] is not present, the following applies:
  If one or more of the following conditions are true, the value of qt_split_cu_flag_luma[x0][y0] is inferred to be equal to 1:
    x0+(1<<log 2CbSize) is greater than pic width in luma samples.
    y0+(1<<log 2CbSize) is greater than pic height in luma samples.
  Otherwise, the value of qt_split_cu_flag_luma[x0][y0] is inferred to be equal to 0.

TABLE 9-7

Values of initValue for ctxIdx of qt_split_cu_flag_luma

| | ctxIdx of qt_split_cu_flag_luma | | | | | | | | |
|---|---|---|---|---|---|---|---|---|---|
| Initialization variable | 0 | 1 | 2 | 3 | 4 | 5 | 6 | 7 | 8 |
| initValue | 139 | 141 | 157 | 107 | 139 | 126 | 107 | 139 | 126 | qt_split_cu_flag_chroma[x0][y0] specifies whether a chroma coding unit is split into chroma coding units with half horizontal and vertical size. The array indices x0, y0 specify the location (x0, y0) of the top-left luma sample of the considered coding block relative to the top-left luma sample of the picture.

When qt_split_cu_flag_chroma[x0][y0] is not present, the following applies:
  If one or more of the following conditions are true, the value of qt_split_cu_flag_chroma[x0][y0] is inferred to be equal to 1:
    x0+(1<<log 2CbSize) is greater than pic width in luma samples.
    y0+(1<<log 2CbSize) is greater than pic height in luma samples.
  Otherwise, the value of qt_split_cu_flag_chroma[x0][y0] is inferred to be equal to 0.

TABLE 9-8

Values of initValue for ctxIdx of qt_split_cu_flag_chroma

| | ctxIdx of qt_split_cu_flag_chroma | | | | | | | | |
|---|---|---|---|---|---|---|---|---|---|
| Initialization variable | 0 | 1 | 2 | 3 | 4 | 5 | 6 | 7 | 8 |
| initValue | 139 | 141 | 157 | 107 | 139 | 126 | 107 | 139 | 126 |

Embodiment 4, Luma Intra Slice and Chroma Intra Slice

In this embodiment, luma syntax and chroma syntax are separated into two different slices. In this way, parsing is parallel by design. The reconstruction of chroma needs luma for prediction, but an encoder/decoder could begin the reconstruction of a chroma CTU if the collocated luma CTU is already encode/decoded in the luma Intra Slice. In a variant, luma and chroma are in two different slice segments, so slice header is in common, thus the overhead of redundant syntax in the slice header is reduced.

In a variant, luma and chroma are in two different slice segments, so slice header is in common, thus the overhead of redundant syntax in the slice header is reduced.

It is to be noted that this embodiment allows color scalability. Indeed, the luma slice may be decoded while the chroma slice may be discarded. In this case, a greyscale image may be obtained. Accordingly, this is an interesting feature if one wants to analyze the luma component but does not need chroma samples. Transcoding from any color format to 4:0:0 is also straightforward in this case.

Separated Luma/Chroma Post-Filtering

Deblocking filter is already separated for luma and chroma. In the case where luma to and chroma tree are separated, we can extend the separation to the post-filters so that they are post filtered independently. For instance, Sample Adaptive Offset (SAO) may be processed for the first luma CTU even if the first chroma CTU is not yet processed.

Figure 10:
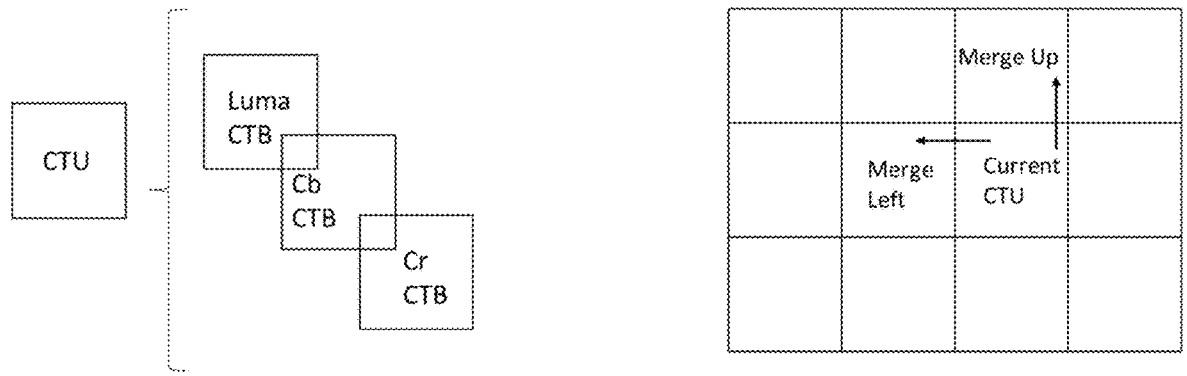
FIG. 10 illustrates an exemplary SAO parameters merge process.

In HEVC, SAO parameters are signaled per component and may be merged between neighboring CTUs. The SAO merging information is shared by all three color components. This is illustrated in FIG. 10.

Figure 11:
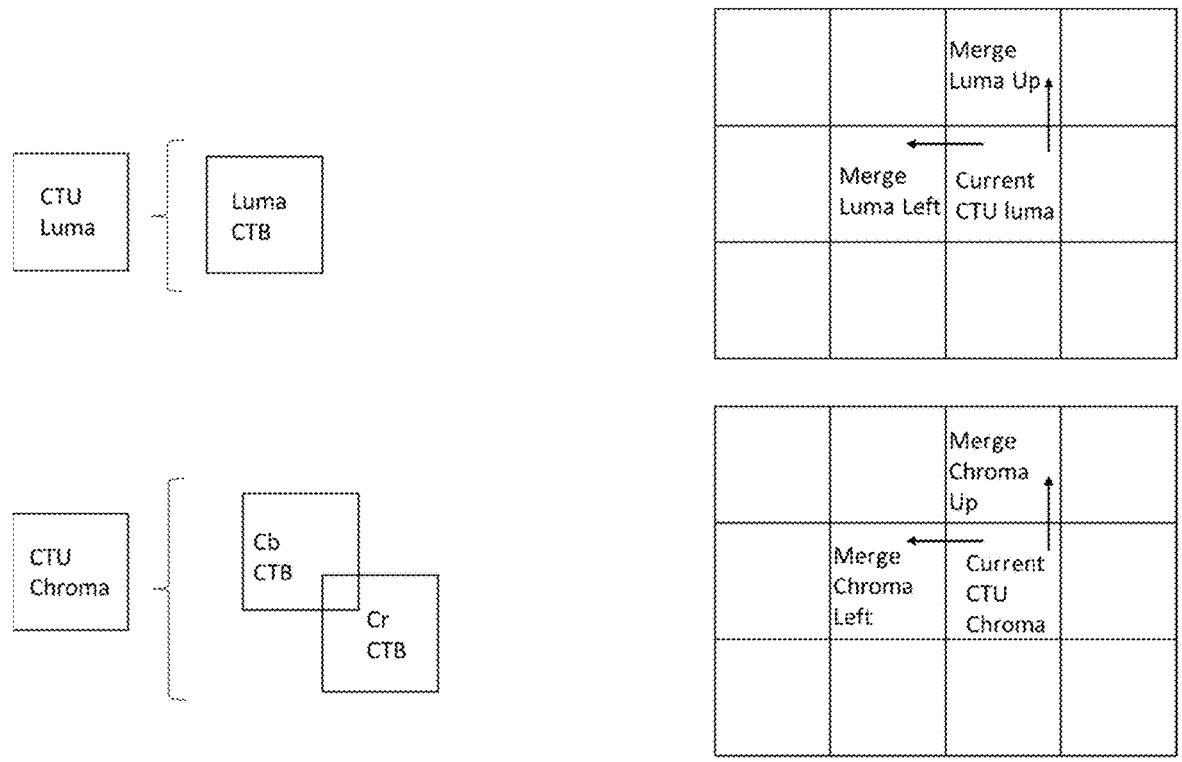
FIG. 11 illustrates another exemplary SAO parameters merge process according to an embodiment.

In the case of parallelized wavefront for luma/chroma components, we separate the merging of luma SAO parameters and chroma SAO parameters. This is illustrated in FIG. 11.

In VTM-1.0, as in HEVC, filtering decisions for chroma components are only based on the block boundary strength ('V'). Therefore, the only data to be shared between the luma and the chroma deblocking are the Bs, which depend on the prediction type. This makes it possible to process chroma components independently of the luma component unlike in H.264/AVC, in which chroma deblocking uses the decisions made for luma deblocking.

In VTM-1.0, ALF (Adaptive Loop Filter) is processed at frame level, and the separation of luma and chroma filter parameters can be separated in the same way.

Separation of all Channels

In this variant of all previous embodiments, all the channels are separated, typically Y, Cb and Cr. This may be applied to all color space as RGB, XYZ, . . . , and etc. This can also be done for all color formats 4:2:0, 4:2:2, 4:4:4 (except 4:0:0 for obvious reason).

Figure 12:
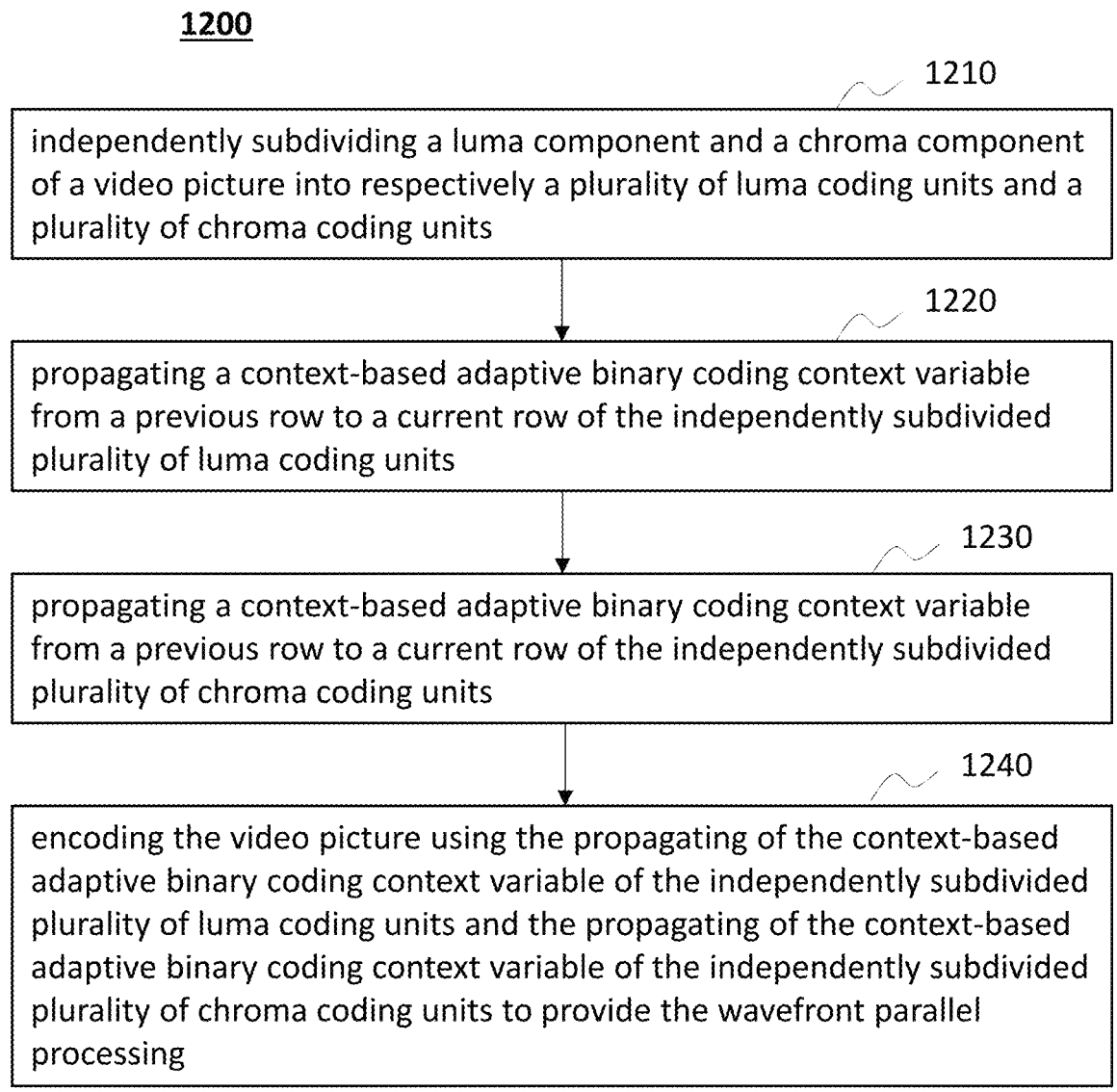
FIG. 12 illustrates an exemplary method of video encoding, according to an embodiment.

FIG. 12 illustrates an exemplary method 1200 for video encoding using wavefront parallel processing, according to an embodiment. At step 1210, the method 1200 independently subdivides a luma component and a chroma component of a video picture into respectively a plurality of luma coding units and a plurality of chroma coding units. At step 1220, the method 1200 propagates a context-based adaptive binary coding context variable from a previous row to a current row of the independently subdivided plurality of luma coding units. At step 1230, the method 1200 propagates a context-based adaptive binary coding context variable from a previous row to a current row of the independently subdivided plurality of chroma coding units. At step 1240, the method 1200 encodes the video picture using the propagating of the context-based adaptive binary coding context variable of the independently subdivided plurality of luma coding units and the propagating of the context-based adaptive binary coding context variable of the independently subdivided plurality of chroma coding units to provide the wavefront parallel processing.

FIG. 13 illustrates an exemplary method 1300 for video decoding using wavefront parallel processing, according to an embodiment. At step 1310, the method 1300 accesses independently subdivided luma component and independently subdivided chroma component of a video picture, wherein the luma component is independently subdivided into a plurality of luma coding units and the chroma component is independently subdivided into a plurality of chroma coding units, and wherein a context-based adaptive binary coding context variable from a previous row is propagated to a current row of the independently subdivided plurality of luma coding units and a context-based adaptive binary coding context variable from a previous row is propagated to a current row of the independently subdivided plurality of chroma coding units At step 1320, the method 1300 decodes the video picture using the propagated context-based adaptive binary coding context variable of the independently subdivided plurality of luma coding units and the propagated context-based adaptive binary coding context variable of the independently subdivided plurality of chroma coding units to provide the wavefront parallel processing Various methods are described above, and each of the methods comprises one or more steps or actions for achieving the described method. Unless a specific order of steps or actions is required for proper operation of the method, the order and/or use of specific steps and/or actions may be modified or combined.

Various numeric values are used in the present application, for example, the values of the number of rows or columns in a picture. It should be noted that the specific values are for exemplary purposes and the present embodiments are not limited to these specific values.

Various methods and other aspects described in this document can be used to modify modules, for example, the entropy coding, and/or decoding modules (145, 230), of a video encoder 100 and decoder 200 as shown in FIG. 1 and FIG. 2. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this document can be used individually or in combination.

Figure 14:
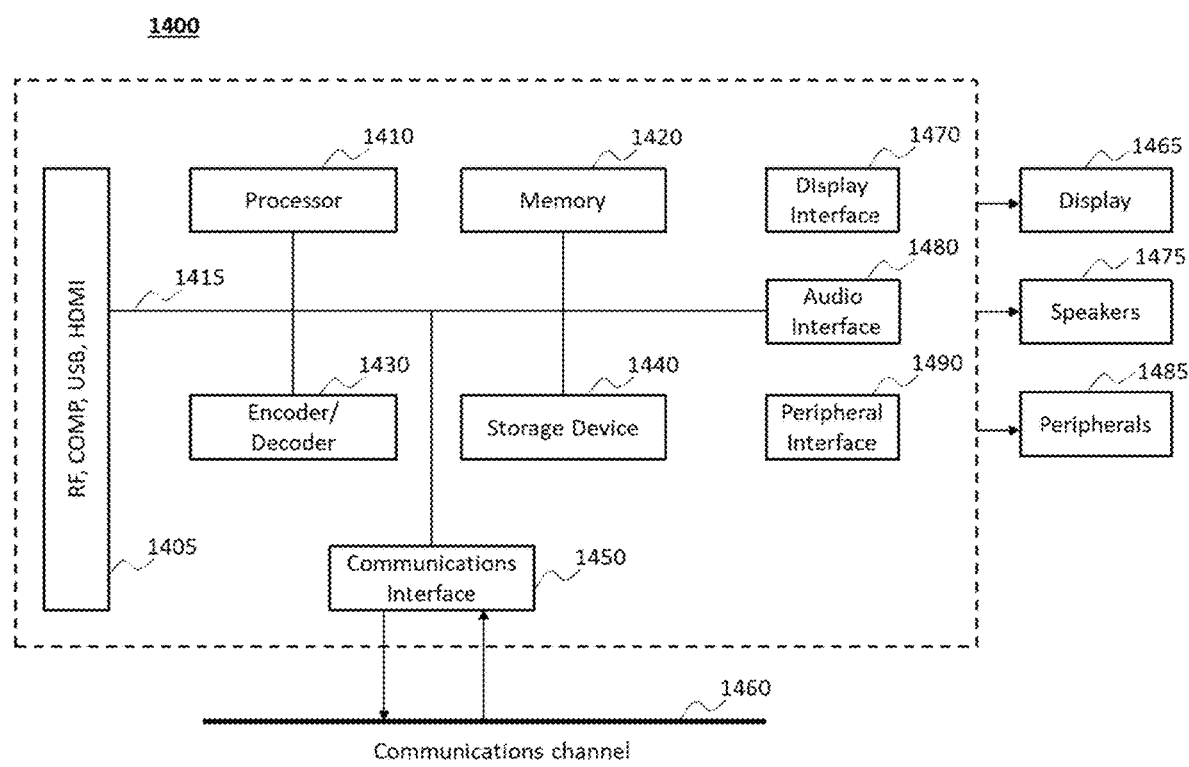
FIG. 14 illustrates a block diagram of a system within which aspects of the present embodiments can be implemented.

FIG. 14 illustrates a block diagram of an example of a system in which various aspects and embodiments are implemented. System 1400 can be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1400, singly or in combination, can be embodied in a single integrated circuit, multiple ICs, and/or discrete components. For example, in at least one embodiment, the processing and encoder/decoder elements of system 1400 are distributed across multiple ICs and/or discrete components. In various embodiments, the system 1400 is communicatively coupled to other systems, or to other electronic devices, via, for example, a communications bus or through dedicated input and/or output ports. In various embodiments, the system 1400 is configured to implement one or more of the aspects described in this document.

The system 1400 includes at least one processor 1410 configured to execute instructions loaded therein for implementing, for example, the various aspects described in this document. Processor 1410 can include embedded memory, input output interface, and various other circuitries as known in the art. The system 1400 includes at least one memory 1420 (e.g., a volatile memory device, and/or a non-volatile memory device). System 1400 includes a storage device 1440, which can include non-volatile memory and/or volatile memory, including, but not limited to, EEPROM, ROM, PROM, RAM, DRAM, SRAM, flash, magnetic disk drive, and/or optical disk drive. The storage device 1440 can include an internal storage device, an attached storage device, and/or a network accessible storage device, as non-limiting examples.

System 1400 includes an encoder/decoder module 1430 configured, for example, to process data to provide an encoded video or decoded video, and the encoder/decoder module 1430 can include its own processor and memory. The encoder/decoder module 1430 represents module(s) that can be included in a device to perform the encoding and/or decoding functions. As is known, a device can include one or both of the encoding and decoding modules. Additionally, encoder/decoder module 1430 can be implemented as a separate element of system 1400 or can be incorporated within processor 1410 as a combination of hardware and software as known to those skilled in the art.

Program code to be loaded onto processor 1410 or encoder/decoder 1430 to perform the various aspects described in this document can be stored in storage device 1440 and subsequently loaded onto memory 1420 for execution by processor 1410. In accordance with various embodiments, one or more of processor 1410, memory 1420, storage device 1440, and encoder/decoder module 1430 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In several embodiments, memory inside of the processor 1410 and/or the encoder/decoder module 1430 is used to store instructions and to provide working memory for processing that is needed during encoding or decoding. In other embodiments, however, a memory external to the processing device (for example, the processing device can be either the processor 1410 or the encoder/decoder module 1430) is used for one or more of these functions. The external memory can be the memory 1420 and/or the storage device 1440, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC (Versatile Video Coding).

The input to the elements of system 1400 can be provided through various input devices as indicated in block 1405. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 1405 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, for example, inserting amplifiers and an analog-to-digital converter. In various embodiments, the RF portion includes an antenna.

Additionally, the USB and/or HDMI terminals can include respective interface processors for connecting system 1400 to other electronic devices across USB and/or HDMI connections. It is to be understood that various aspects of input processing, for example, Reed-Solomon error correction, can be implemented, for example, within a separate input processing IC or within processor 1410 as necessary. Similarly, aspects of USB or HDMI interface processing can be implemented within separate interface ICs or within processor 1410 as necessary. The demodulated, error corrected, and demultiplexed stream is provided to various processing elements, including, for example, processor 1410, and encoder/decoder 1430 operating in combination with the memory and storage elements to process the datastream as necessary for presentation on an output device.

Various elements of system 1400 can be provided within an integrated housing. Within the integrated housing, the various elements can be interconnected and transmit data therebetween using suitable connection arrangement 1415, for example, an internal bus as known in the art, including the I2C bus, wiring, and printed circuit boards.

The system 1400 includes communication interface 1450 that enables communication with other devices via communication channel 1460. The communication interface 1450 can include, but is not limited to, a transceiver configured to transmit and to receive data over communication channel 1490. The communication interface 1450 can include, but is not limited to, a modem or network card and the communication channel 1490 can be implemented, for example, within a wired and/or a wireless medium.

Data is streamed to the system 1400, in various embodiments, using a Wi-Fi network such as IEEE 802.11. The Wi-Fi signal of these embodiments is received over the to communications channel 1490 and the communications interface 1450 which are adapted for Wi-Fi communications. The communications channel 1490 of these embodiments is typically connected to an access point or router that provides access to outside networks including the Internet for allowing streaming applications and other over-the-top communications. Other embodiments provide streamed data to the system 1400 using a set-top box that delivers the data over the HDMI connection of the input block 1405. Still other embodiments provide streamed data to the system 1400 using the RF connection of the input block 1405.

The system 1400 can provide an output signal to various output devices, including a display 1465, speakers 1475, and other peripheral devices 1485. The other peripheral devices 1485 include, in various examples of embodiments, one or more of a stand-alone DVR, a disk player, a stereo system, a lighting system, and other devices that provide a function based on the output of the system 1400. In various embodiments, control signals are communicated between the system 1400 and the display 1465, speakers 1475, or other peripheral devices 1485 using signaling such as AV.Link, CEC, or other communications protocols that enable device-to-device control with or without user intervention. The output devices can be communicatively coupled to system 1400 via dedicated connections through respective interfaces 1460, 1470, and 1480. Alternatively, the output devices can be connected to system 1400 using the communications channel 1460 via the communications interface 1450. The display 1465 and speakers 1475 can be integrated in a single unit with the other components of system 1400 in an electronic device, for example, a television. In various embodiments, the display interface 1460 includes a display driver, for example, a timing controller (T Con) chip.

The display 1465 and speaker 1475 can alternatively be separate from one or more of the other components, for example, if the RF portion of input 1405 is part of a separate set-top box. In various embodiments in which the display 1465 and speakers 1475 are external components, the output signal can be provided via dedicated output connections, including, for example, HDMI ports, USB ports, or COMP outputs.

According to an embodiment, a method for video encoding using wavefront parallel processing is presented, comprising: independently subdividing a luma component and a chroma component of a video picture into respectively a plurality of luma coding units and a plurality of chroma coding units; propagating a context-based adaptive binary coding context variable from a previous row to a current row of the independently subdivided plurality of luma coding units; propagating a context-based adaptive binary coding context variable from a previous row to a current row of the independently subdivided plurality of chroma coding units; and encoding the video picture using the propagating of the context-based adaptive binary coding context variable of the independently subdivided plurality of luma coding units and the propagating of the context-based adaptive binary coding context variable of the independently subdivided plurality of chroma coding units to provide the wavefront parallel processing.

According to another embodiment, a method for video decoding using wavefront parallel processing is presented, comprising: accessing independently subdivided luma component and independently subdivided chroma component of a video picture, wherein the luma component is independently subdivided into a plurality of luma coding units and the chroma component is independently subdivided into a plurality of chroma coding units, and wherein a context-based adaptive binary coding context variable from a previous row is propagated to a current row of the independently subdivided plurality of luma coding units and a context-based adaptive binary coding context variable from a previous row is propagated to a current row of the independently subdivided plurality of chroma coding units; and decoding the video picture using the propagated context-based adaptive binary coding context variable of the independently subdivided plurality of luma coding units and the propagated context-based adaptive binary coding context variable of the independently subdivided plurality of chroma coding units to provide the wavefront parallel processing.

According to another embodiment, an apparatus for video encoding is presented, comprising one or more processors, wherein said one or more processors are configured to: independently subdivide a luma component and a chroma component of a video picture into respectively a plurality of luma coding units and a plurality of chroma coding units; propagate a context-based adaptive binary coding context variable from a previous row to a current row of the independently subdivided plurality of luma coding units; propagate a context-based adaptive binary coding context variable from a previous row to a current row of the independently subdivided plurality of chroma coding units; and encode the video picture using the propagating of the context-based adaptive binary coding context variable of the independently subdivided plurality of luma coding units and the propagating of the context-based adaptive binary coding context variable of the independently subdivided plurality of chroma coding units to provide the wavefront parallel processing.

According to another embodiment, an apparatus for video decoding is presented, comprising one or more processors, wherein said one or more processors are configured to: access independently subdivided luma component and independently subdivided chroma component of a video picture, wherein the luma component is independently subdivided into a plurality of luma coding units and the chroma component is independently subdivided into a plurality of chroma coding units, and wherein a context-based adaptive binary coding context variable from a previous row is propagated to a current row of the independently subdivided plurality of luma coding units and a context-based adaptive binary coding context variable from a previous row is propagated to a current row of the independently subdivided plurality of chroma coding units; and decode the video picture using the propagated context-based adaptive binary coding context variable of the independently subdivided plurality of luma coding units and the propagated context-based adaptive binary coding context variable of the independently subdivided plurality of chroma coding units to provide the wavefront parallel processing.

According to another embodiment, an apparatus for video encoding is presented, comprising: means for independently subdividing a luma component and a chroma component of a video picture into respectively a plurality of luma coding units and a plurality of chroma coding units; means for propagating a context-based adaptive binary coding context variable from a previous row to a current row of the independently subdivided plurality of luma coding units; propagating a context-based adaptive binary coding context variable from a previous row to a current row of the independently subdivided plurality of chroma coding units; and means for encoding the video picture using the propagating of the context-based adaptive binary coding context variable of the independently subdivided plurality of luma coding units and the propagating of the context-based adaptive binary coding context variable of the independently subdivided plurality of chroma coding units to provide the wavefront parallel processing According to another embodiment, an apparatus for video decoding is presented, comprising: means for accessing independently subdivided luma component and independently subdivided chroma component of a video picture, wherein the luma component is independently subdivided into a plurality of luma coding units and the chroma component is independently subdivided into a plurality of chroma coding units, and wherein a context-based adaptive binary coding context variable from a previous row is propagated to a current row of the independently subdivided plurality of luma coding units and a context-based adaptive binary coding context variable from a previous row is propagated to a current row of the independently subdivided plurality of chroma coding units; and means for decoding the video picture using the propagated context-based adaptive binary coding context variable of the independently subdivided plurality of luma coding units and the propagated context-based adaptive binary coding context variable of the independently subdivided plurality of chroma coding units to provide the wavefront parallel processing According to another embodiment, a video signal comprising a video picture is presented, formed by performing: independently subdividing a luma component and a chroma component of the video picture into respectively a plurality of luma coding units and a plurality of chroma coding units; propagating a context-based adaptive binary coding context variable from a previous row to a current row of the independently subdivided plurality of luma coding units;

propagating a context-based adaptive binary coding context variable from a previous row to a current row of the independently subdivided plurality of chroma coding units; and encoding the video picture using the propagating of the context-based adaptive binary coding context variable of the independently subdivided plurality of luma coding units and the propagating of the context-based adaptive binary coding context variable of the independently subdivided plurality of chroma coding units to provide the wavefront parallel processing.

According to an embodiment, the propagation of contexts in the luma component is independent of the propagation of context in the chroma component.

According to an embodiment, the independently subdivided plurality of luma coding units and the independently subdivided plurality of luma coding units are subdivided based on quadtree plus binary tree subdivision.

According to an embodiment, the context-based adaptive binary coding context variable for the luma component is propagated from a luma coding unit in a second position of the previous row to a first position of the current row and the context-based adaptive binary coding context variable for the chroma component is propagated from a chroma coding unit in a second position of the previous row to a first position of the current row.

According to an embodiment, at least one context-based adaptive binary coding context variable for a chroma coding unit of the chroma component is also propagated from a collocated luma coding unit of the luma component.

According to an embodiment, one or more of context-based adaptive binary coding context variables are shared between the luma component and the chroma component.

According to an embodiment, separate syntax elements are used to independently represent luma context-based adaptive binary coding context variables for the luma component and chroma context-based adaptive binary coding context variables for the chroma component.

According to an embodiment, the luma component and the chroma component are in different slices or slice segments.

According to an embodiment, the luma component and the chroma component are post filtered independently.

An embodiment provides a computer program comprising instructions which when executed by one or more processors cause the one or more processors to perform the encoding method or decoding method according to any of the embodiments described above. One or more of the present embodiments also provide a computer readable storage medium having stored thereon instructions for encoding or decoding video data according to the methods described above. One or more embodiments also provide a computer readable storage medium having stored thereon a bitstream or data content generated according to the methods described above. One or more embodiments also provide a method and apparatus for transmitting or receiving the bitstream or data content generated according to the methods described above.

Various implementations involve decoding. "Decoding," as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, mean that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, moving the information, copying the information, calculating the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

The aspects described and contemplated in this document can be implemented in many different forms. FIGS. 12, 13 and 14 below provide some embodiments, but other embodiments are contemplated and the discussion of FIGS. 12, 13 and 14 does not limit the breadth of the to implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method for video encoding, comprising:
   independently subdividing a luma component and a chroma component of a video picture into respectively a plurality of luma coding tree units and a plurality of chroma coding tree units;
   propagating a context-based adaptive binary coding context variable from a previous row to a current row of the plurality of luma coding tree units;
   propagating a context-based adaptive binary coding context variable from a previous row to a current row of the plurality of chroma coding tree units; and
   encoding the video picture into a bitstream, using the propagated context-based adaptive binary coding context variable of the plurality of luma coding tree units and the propagated context-based adaptive binary coding context variable of the plurality of chroma coding tree units,
   wherein syntax data for luma and chroma for a given coding tree unit are separated in two different sub-streams of the bitstream,
   wherein a first one of the two sub-streams includes syntax data for a plurality of coding tree units and only includes syntax data for luma, and
   wherein a second one of the two sub-streams includes syntax data for the plurality of coding tree units and only includes syntax data for chroma.

2. The method of claim 1, wherein the context-based adaptive binary coding context variable for the luma component is propagated from a luma coding tree unit in a second position of the previous row to a first position of the current row and the context-based adaptive binary coding context variable for the chroma component is propagated from a chroma coding tree unit in a second position of the previous row to a first position of the current row.

3. The method of claim 2, wherein the plurality of coding tree units included in the first sub-stream correspond to a row of coding tree units or the video picture.

4. The method of claim 1, wherein a respective entry point is used to indicate where to start decoding for each of the two different sub-stream.

5. The method of claim 1, wherein the propagating of the context-based adaptive binary coding context variable in luma coding tree units is independent of the propagating of the context-based adaptive binary coding context variable in chroma coding tree units.

6. The method of claim 1, wherein separate syntax elements are used to independently represent luma context-based adaptive binary coding context variables for the luma component and chroma context-based adaptive binary coding context variables for the chroma component.

7. The method of claim 1, wherein the luma component and the chroma component are in different slices or slice segments.

8. The method of claim 1, wherein the luma component and the chroma component are post filtered independently.

9. A method for video decoding using wavefront parallel processing, comprising:
   accessing from a bitstream luma component and chroma component of a video picture, wherein the luma component is independently subdivided into a plurality of luma coding tree units and the chroma component is independently subdivided into a plurality of chroma coding tree units,
   wherein syntax data for luma and chroma for a given coding tree unit are separated in two different sub-streams of the bitstream,
   wherein a first one of the two sub-streams includes syntax data for a plurality of coding tree units and only includes syntax data for luma,
   wherein a second one of the two sub-streams includes syntax data for the plurality of coding tree units and only includes syntax data for chroma, and
   wherein a context-based adaptive binary coding context variable from a previous row is propagated to a current row of the plurality of luma coding tree units and a context-based adaptive binary coding context variable from a previous row is propagated to a current row of the plurality of chroma coding tree units; and
   decoding the video picture using the propagated context-based adaptive binary coding context variable of the plurality of luma coding tree units and the propagated context-based adaptive binary coding context variable of the plurality of chroma coding tree units to provide the wavefront parallel processing.

10. The method of claim 9, wherein the context-based adaptive binary coding context variable for the luma component is propagated from a luma coding tree unit in a second position of the previous row to a first position of the current row and the context-based adaptive binary coding context variable for the chroma component is propagated from a chroma coding tree unit in a second position of the previous row to a first position of the current row.

11. The method of claim 9, wherein the plurality of coding tree units included in the first sub-stream correspond to a row of coding tree units or the video picture.

12. The method of claim 9, wherein a respective entry point is used to indicate where to start decoding for each of the two different sub-streams.

13. The method of claim 9, wherein the propagating of the context-based adaptive binary coding context variable in luma coding tree units is independent of the propagating of the context-based adaptive binary coding context variable in chroma coding tree units.

14. The method of claim 9, wherein separate syntax elements are used to independently represent luma context-based adaptive binary coding context variables for the luma component and chroma context-based adaptive binary coding context variables for the chroma component.

15. An apparatus for encoding video data, comprising:
one or more processors, wherein said one or more processors are configured to:
independently subdivide a luma component and a chroma component of a video picture into respectively a plurality of luma coding tree units and a plurality of chroma coding tree units;
propagate a context-based adaptive binary coding context variable from a previous row to a current row of the plurality of luma coding tree units;
propagate a context-based adaptive binary coding context variable from a previous row to a current row of the plurality of chroma coding tree units; and
encode the video picture into a bitstream, using the propagated context-based adaptive binary coding context variable of the luma coding tree units and the propagated context-based adaptive binary coding context variable of the plurality of chroma coding tree units, wherein syntax data for luma and chroma for a given coding tree unit are separated in two different sub-streams of the bitstream,
wherein a first one of the two sub-streams includes syntax data for a plurality of coding tree units and only includes syntax data for luma, and
wherein a second one of the two sub-streams includes syntax data for the plurality of coding tree units and only includes syntax data for chroma.

16. An apparatus for decoding video data, comprising:
one or more processors, wherein said one or more processors are configured to:
access from a bitstream luma component and chroma component of a video picture,
wherein the luma component is independently subdivided into a plurality of luma coding tree units and the chroma component is independently subdivided into a plurality of chroma coding tree units,
wherein syntax data for luma and chroma for a given coding tree unit are separated in two different sub-streams of the bitstream,
wherein a first one of the two sub-streams includes syntax data for a plurality of coding tree units and only includes syntax data for luma,
wherein a second one of the two sub-streams includes syntax data for the plurality of coding tree units and only includes syntax data for chroma, and
wherein a context-based adaptive binary coding context variable from a previous row is propagated to a current row of the plurality of luma coding tree units and a context-based adaptive binary coding context variable from a previous row is propagated to a current row of the plurality of chroma coding tree units; and
decode the video picture using the propagated context-based adaptive binary coding context variable of the plurality of luma coding tree units and the propagated context-based adaptive binary coding context variable of the plurality of chroma coding tree units to provide the wavefront parallel processing.

17. The apparatus of claim 16, wherein the context-based adaptive binary coding context variable for the luma component is propagated from a luma coding tree unit in a second position of the previous row to a first position of the current row and the context-based adaptive binary coding context variable for the chroma component is propagated from a chroma coding tree unit in a second position of the previous row to a first position of the current row.

18. The apparatus of claim 16, wherein the plurality of coding tree units included in the first sub-stream correspond to a row of coding tree units or the video picture.

19. The apparatus of claim 16, wherein a respective entry point is used to indicate where to start decoding for each of the two different sub-streams.

20. The apparatus of claim 16, wherein the propagating of the context-based adaptive binary coding context variable in luma coding tree units is independent of the propagating of the context-based adaptive binary coding context variable in chroma coding tree units.

* * * * *